(12) United States Patent
Kim et al.

(10) Patent No.: US 12,578,755 B2
(45) Date of Patent: Mar. 17, 2026

(54) ELECTRONIC DEVICE INCLUDING HINGE DEVICE

(71) Applicant: SAMSUNG ELECTRONICS CO., LTD., Suwon-si (KR)

(72) Inventors: Jongkeun Kim, Suwon-si (KR); Jongyoon Kim, Suwon-si (KR); Hyungsoo Kim, Suwon-si (KR); Daehyeong Park, Suwon-si (KR); Soobin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 18/208,121

(22) Filed: Jun. 9, 2023

(65) Prior Publication Data

US 2023/0409077 A1     Dec. 21, 2023

Related U.S. Application Data

(63) Continuation of application No. PCT/KR2023/006351, filed on May 10, 2023.

(30) Foreign Application Priority Data

Jun. 10, 2022   (KR) ........................ 10-2022-0070866
Jul. 1, 2022   (KR) ........................ 10-2022-0081425

(51) Int. Cl.
*G06F 1/16*            (2006.01)
(52) U.S. Cl.
CPC .......... *G06F 1/1616* (2013.01); *G06F 1/1652* (2013.01); *G06F 1/1681* (2013.01)
(58) Field of Classification Search
CPC ..... G06F 1/1681; G06F 1/1652; G06F 1/1616
See application file for complete search history.

(56) References Cited

U.S. PATENT DOCUMENTS

| | | | |
|---|---|---|---|
| 10,469,635 B1 | 11/2019 | Carlson et al. | |
| 11,336,759 B2 | 5/2022 | Liao et al. | |

(Continued)

FOREIGN PATENT DOCUMENTS

| | | |
|---|---|---|
| KR | 10-2015-0096946 A | 8/2015 |
| KR | 10-2020-0091809 A | 7/2020 |

(Continued)

OTHER PUBLICATIONS

International Search Report (PCT/ISA/210) issued by the International Searching Authority on Aug. 16, 2023 in corresponding International Application No. PCT/KR2023/006351.

(Continued)

*Primary Examiner* — Anthony Q Edwards
(74) *Attorney, Agent, or Firm* — Sughrue Mion, PLLC

(57) ABSTRACT

An electronic device may include a first housing, a second housing, a hinge device configured to connect the first housing and the second housing to be foldable with respect to a folding axis, and a flexible display disposed to be supported by the first housing and the second housing, wherein the hinge device includes a hinge bracket, a first slide rail movably disposed at the hinge bracket and at one side of the folding axis, a second slide rail movably disposed at the hinge bracket and at the other side of the folding axis, a first rotator rotatably disposed on the first slide rail, and a second rotator rotatably disposed on the second slide rail, wherein when the electronic device transitions from a folded state to an unfolded state or vice-versa, the first slide rail and the second slide rail are moved with respect to the hinge bracket by a designated linear distance.

20 Claims, 38 Drawing Sheets

(56) References Cited

U.S. PATENT DOCUMENTS

| | | | | |
|---|---|---|---|---|
| 11,678,448 | B2 * | 6/2023 | Kang | G06F 1/1681 |
| | | | | 361/809 |
| 2021/0018960 | A1 * | 1/2021 | Kato | G06F 1/1681 |
| 2021/0109566 | A1 | 4/2021 | Myeong et al. | |
| 2021/0165466 | A1 | 6/2021 | Kang et al. | |
| 2021/0181808 | A1 | 6/2021 | Liao et al. | |
| 2021/0208641 | A1 * | 7/2021 | Huang | H04M 1/022 |
| 2021/0247814 | A1 | 8/2021 | Nguyen et al. | |
| 2022/0091635 | A1 | 3/2022 | Ou et al. | |
| 2022/0116489 | A1 * | 4/2022 | Nagai | G06F 1/1652 |
| 2022/0121248 | A1 | 4/2022 | Lee | |
| 2022/0321685 | A1 | 10/2022 | Park et al. | |

FOREIGN PATENT DOCUMENTS

| | | | |
|---|---|---|---|
| KR | 10-2020-0102527 | A | 8/2020 |
| KR | 10-2020-0109602 | A | 9/2020 |
| KR | 10-2228223 | B1 | 3/2021 |
| KR | 10-2233336 | B1 | 3/2021 |
| KR | 10-2021-0044337 | A | 4/2021 |
| KR | 10-2021-0063908 | A | 6/2021 |
| KR | 10-2021-0066784 | A | 6/2021 |
| KR | 10-2021-0068880 | A | 6/2021 |
| KR | 10-2299989 | B1 | 9/2021 |
| KR | 10-2022-0061651 | A | 5/2022 |
| WO | 2021/115462 | A1 | 6/2021 |

OTHER PUBLICATIONS

Written Opinion (PCT/ISA/237) issued by the International Searching Authority on Aug. 16, 2023 in corresponding International Application No. PCT/KR2023/006351.

Extended European Search Report dated May 28, 2025, issued by the European Patent Office in European Patent Application No. 23820001.8.

Communication issued on Dec. 26, 2025 by the Indian Patent Office in corresponding IN Patent Application No. 202417080653.

\* cited by examiner

414

ELECTRONIC DEVICE INCLUDING HINGE DEVICE

CROSS-REFERENCE TO RELATED APPLICATIONS

This application is a by-pass continuation of International Application No. PCT/KR2023/006351, filed on May 10, 2023, which is based on and claims priority to Korean Patent Application No. 10-2022-0070866, filed on Jun. 10, 2022, and Korean Patent Application No. 10-2022-0081425, filed Jul. 1, 2022, in the Korean Intellectual Property Office, the disclosures of which are incorporated by reference herein in their entireties.

BACKGROUND

1. Field

The disclosure relates to an electronic device including a hinge device.

2. Description of Related Art

As the functional gap between electronic devices by each manufacturer is significantly reduced, in order to satisfy consumers' purchasing desire, the electronic devices are gradually becoming slimmer, the rigidity thereof is being increased, and the design aspect thereof is being strengthened. At the same time, the electronic devices are being improved to differentiate the functional elements thereof. These electronic devices are gradually changing into various shapes, breaking away from the uniform rectangular shape. For example, the electronic device may include a deformable foldable electronic device in which at least two housings are foldably coupled to each other, so as to be carried conveniently and provide a large screen display when used. The foldable electronic device may include a hinge device configured to connect at least two housings and may require an improved hinge mechanism in which bending of a flexible display is considered.

An electronic device may include a foldable electronic device including a first housing and a second housing foldably connected to the first housing through at least one hinge device (e.g., a hinge module or a hinge structure). The first housing and the second housing may be operated through at least one hinge device during transition to a folded state and/or an unfolded state. The foldable electronic device may be operated in an in-folding method and/or an out-folding method by rotating the first housing and the second housing with respect to each other within a designated range from 0 degrees to 360 degrees through at least one hinge device.

The foldable electronic device may include a flexible display disposed to cross the first housing and the second housing in an unfolded state. In a folded state, the flexible display may have a folding area deformed into a designated shape. For example, the first housing and the second housing need to be designed to rotate about rotational axes located separately from a folding axis of the flexible display to enable the folding area of the flexible display to be deformed into a curved shape. The folding area of the flexible display may be deformed into various curved shapes (e.g., a "U" shape or a waterdrop shape) in an inner space of the electronic device according to a folding operation. In this case, when fixed rotational axes are configured in consideration of only the position of the flexible display in the folded/unfolded state, the flexible display may be compressed while transitioning from the unfolded state to the folded state, and as a result, buckling of the display may occur.

Meanwhile, in the flexible display, when the folding area is deformed into a waterdrop shape (e.g., a dumbbell shape) in the folded state, a rotator rotatably connected with respect to the housings may support a hinge plate, and the rotator may be pivotally and rotatably connected to an arm rotatably connected to at least one hinge device. Accordingly, in the folded state, the hinge plate and the housing may be configured to support the rear surface of the flexible display through the other surfaces that are not parallel to each other.

However, the configuration in which an assembly structure for the pivot rotation of the rotator and the arm is arranged to be operated outside the hinge device may cause difficulties in securing an efficient arrangement space in the inner space of an electronic device that is gradually becoming slimmer, and may increase an unwanted mobility of each part due to design/assembly deviations between parts, thereby degrading operation reliability of the electronic device.

SUMMARY

The disclosure provides an electronic device including a hinge device that advantageously improves operational reliability of a flexible display.

The disclosure provides an electronic device including a hinge device contributing to reduction of mobility of each part thereof.

The disclosure provides an electronic device including a hinge device capable of reducing surface quality deterioration even after frequent operations.

The problem to be solved in the disclosure is not limited to the above-mentioned problem, and may be expanded in various ways without departing from the spirit and scope of the disclosure.

According to an aspect of the disclosure, an electronic device includes: a first housing; a second housing; a hinge device configured to connect the first housing and the second housing and to be foldable with respect to a folding axis; and a flexible display supported by the first housing and the second housing, wherein the hinge device includes: a hinge bracket; a first slide rail movably disposed at the hinge bracket on a first side of the folding axis; a second slide rail movably disposed at the hinge bracket on a second side of the folding axis; a first rotator rotatably disposed on the first slide rail; and a second rotator rotatably disposed on the second slide rail, and wherein the first slide rail and the second slide rail are configured to move a designated linear distance relative to the hinge bracket when the electronic device transitions from a folded state to an unfolded state or when the electronic device transitions from the unfolded state to the folded state.

The first rotator may be connected to the first housing, may be rotatably coupled to the first slide rail, and may be configured to rotate around a first rotational axis. The second rotator may be connected to the second housing may be rotatably coupled to the second slide rail, and may be configured to rotate around a second rotational axis. And, the first rotational axis may be moved by movement of the first slide rail and the second rotational axis may be moved by movement of the second slide rail when the electronic device transitions from the folded state to the unfolded state or when the electronic device transitions from the unfolded state to the folded state.

The first rotational axis may be located at an identical position relative to the folding axis in the folded state and the unfolded state, and the second rotational axis may be located at an identical position relative to the folding axis in the folded state and the unfolded state.

The first slide rail and the second slide rail may each have a maximum linear movement distance corresponding to a designated intermediate folding angle of the hinge device.

The designated intermediate folding angle may be 45 degrees.

The flexible display may include a folding area, and the intermediate folding angle may be based on a deformed shape of the folding area in the folded state.

The hinge bracket may include a first rail receiving part and a second rail receiving part, wherein the first slide rail may include a guide groove comprising a designated length, wherein the guide groove of the first slide rail may be coupled to the first rail receiving part such that the first slide rail is linearly movable, and the second slide rail may include a guide groove having a designated length, wherein the guide groove of the second slide rail may be coupled to the second rail receiving part such that the second slide rail is linearly movable.

The first rotator may include a curved rotation part including a first guide rail, and the second rotator may include a curved rotation part including a second guide rail, wherein the first slide rail includes a first curved guide rib disposed on an outer surface thereof, and the first rotator is rotatably coupled to the first slide rail via insertion of the first curved guide rib into the first guide rail, and wherein the second slide rail includes a second curved guide rib disposed on an outer surface thereof, and the second rotator is rotatably coupled to the second slide rail via insertion of the second curved guide rib into the second guide rail.

The electronic device may further include: a first support rotator having one end rotatably coupled to the hinge bracket and the other end rotatably coupled to the first rotator; and a second support rotator having one end rotatably coupled to the hinge bracket and the other end rotatably coupled to the second rotator.

The electronic device may further include: a first hinge plate coupled to the first support rotator; and a second hinge plate coupled to the second support rotator, wherein in the unfolded state, the first housing, the first hinge plate, the second housing, and the second hinge plate form a plane.

In the folded state, the first housing and the first hinge plate may form a first plane, and the second housing and the second hinge plate may form a second plane, wherein the first plane and the second plane are different.

The electronic device may further include: a first housing bracket configured to fix the first rotator to the first housing; and a second housing bracket configured to fix the second rotator to the second housing, wherein the first support rotator is rotatably fixed to the first housing bracket, and wherein the second support rotator is rotatably fixed to the second housing bracket.

In the folded state, the folding area of the flexible display may be deformed into a waterdrop shape.

According to an aspect of the disclosure, a hinge device for a foldable electronic device having a folding axis includes: a hinge bracket; a first slide rail movably disposed at the hinge bracket on a first side of the folding axis; a second slide rail movably disposed at the hinge bracket on a second side of the folding axis; a first rotator disposed on the first slide rail to be rotatable around a first rotational axis; and a second rotator disposed on the second slide rail to be rotatable around a second rotational axis, wherein, the first rotational axis is moved through movement of the first slide rail, and the second rotational axis is moved through movement of the second slide rail when the electronic device transitions from a folded state to an unfolded state or when the electronic device transitions from the unfolded state to the folded state.

The first slide rail and the second slide rail may be configured to be linearly movable.

The first rotational axis may be located at an identical position relative to the folding axis in the folded state and the unfolded state, and the second rotational axis may be located at an identical position relative to the folding axis in the folded state and the unfolded state.

The first slide rail and the second slide rail may each have a maximum linear movement distance corresponding to a designated intermediate folding angle of the hinge device.

The intermediate folding angle may be determined according to a deformed shape of a display of the foldable electronic device in the folded state.

The first rotator may include a curved rotation part comprising a first guide rail, and the second rotator may include a curved rotation part comprising a second guide rail, wherein the first slide rail comprises a first curved guide rib disposed on an outer surface thereof, and the first rotator is rotatably coupled to the first slide rail via insertion of the first curved guide rib into the first guide rail, and wherein the second slide rail comprises a second curved guide rib disposed on an outer surface thereof, and the second rotator is rotatably coupled to the second slide rail via insertion of the second curved guide rib into the second guide rail.

The hinge device may further include: a first support rotator having one end rotatably coupled to the hinge bracket and the other end rotatably coupled to the first rotator; and a second support rotator having one end rotatably coupled to the hinge bracket and the other end rotatably coupled to the second rotator.

An electronic device according to embodiments of the disclosure may have an assembly structure in which rotational axis linearly reciprocates in a designated direction while a housing is rotated, through a slide rail arranged as a direct component of a hinge device, so that unwanted mobility generated during operation may be reduced, and operation reliability of the electronic device may be improved. In addition, this assembly structure may advantageously reduce surface quality deterioration of a flexible display even after frequent folding operations.

In addition, various effects that are identified directly or indirectly through this document may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

In connection with the description of the drawings, the same or similar reference numerals may be used for the same or similar elements.

DETAILED DESCRIPTION

Figure 1A:
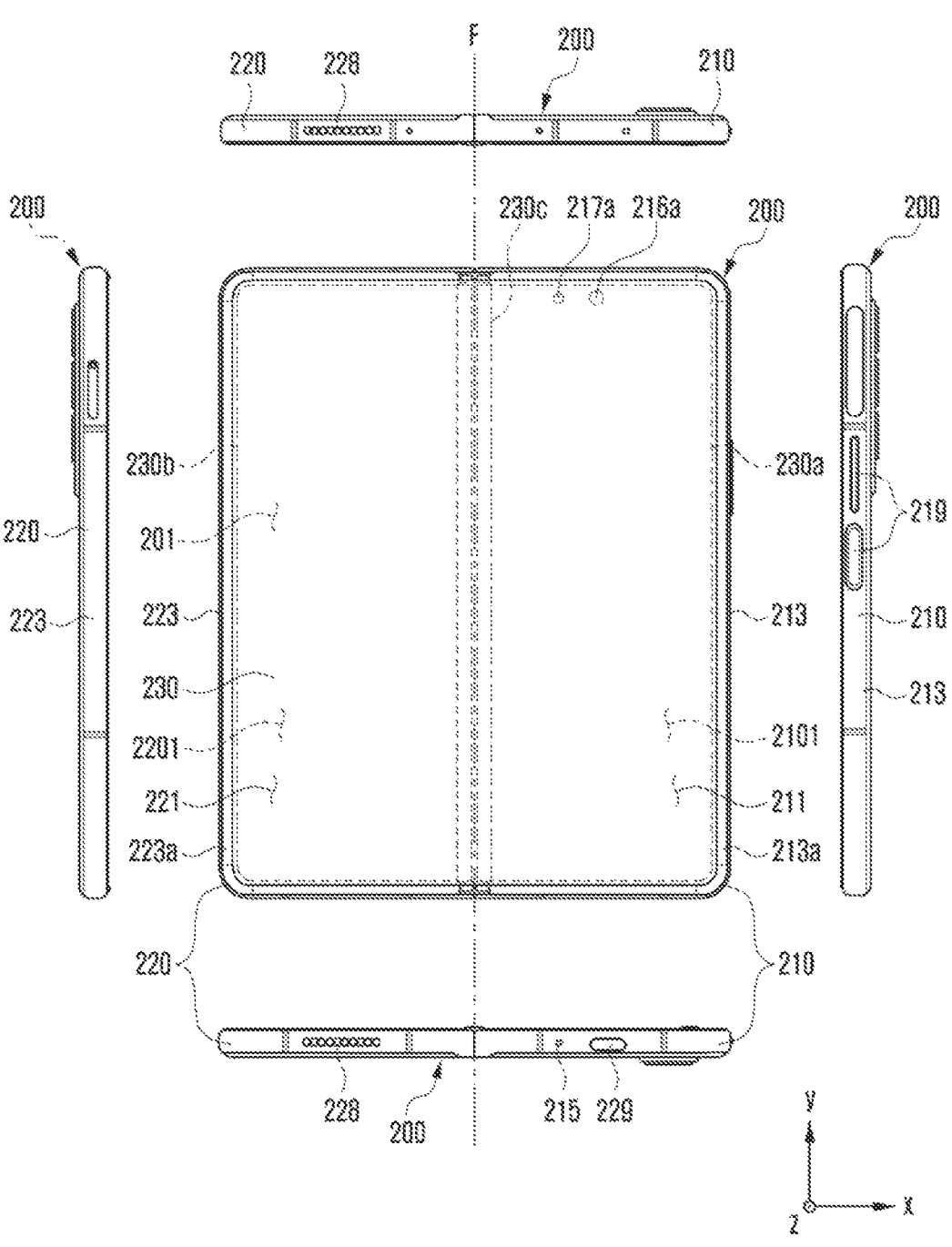
FIG. 1A is a front, side, top and bottom view of an unfolded state of an electronic device according to various embodiments of the disclosure.
Figure 1B:
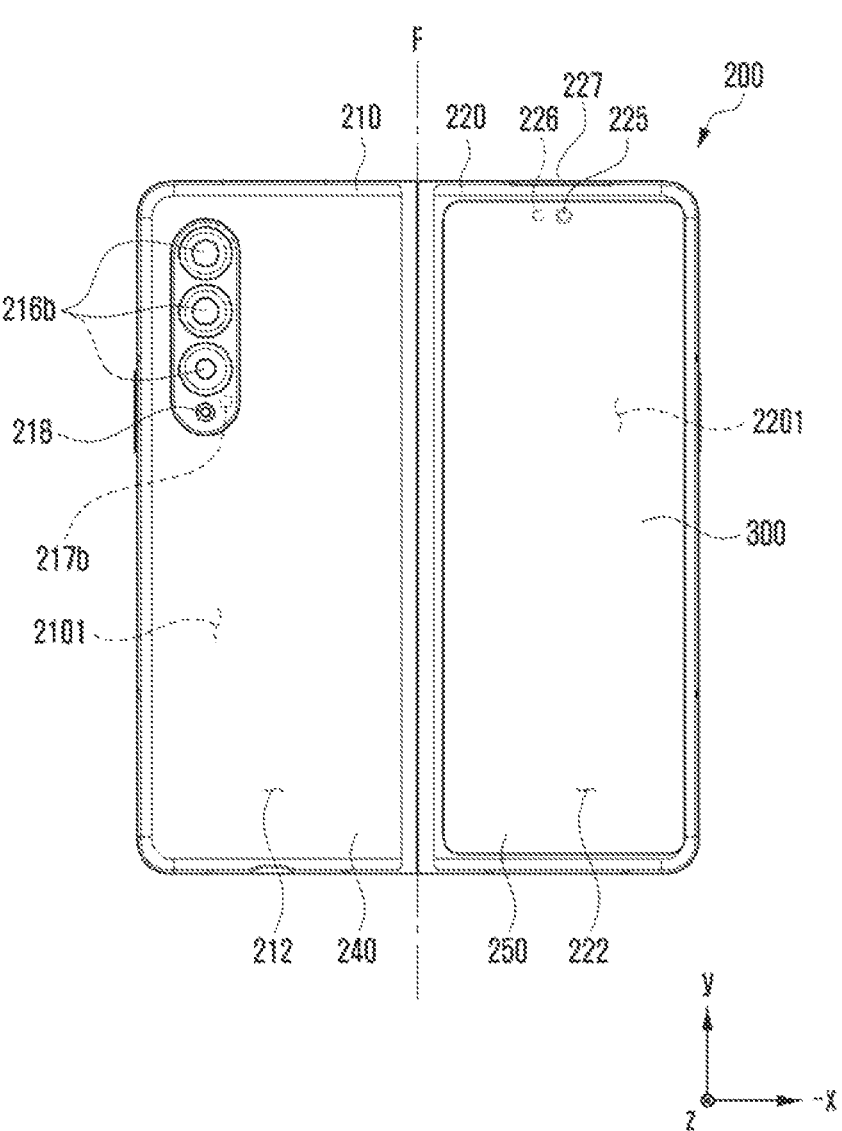
FIG. 1B is a rear view of an unfolded state of an electronic device according to various embodiments of the disclosure.
Figure 2A:
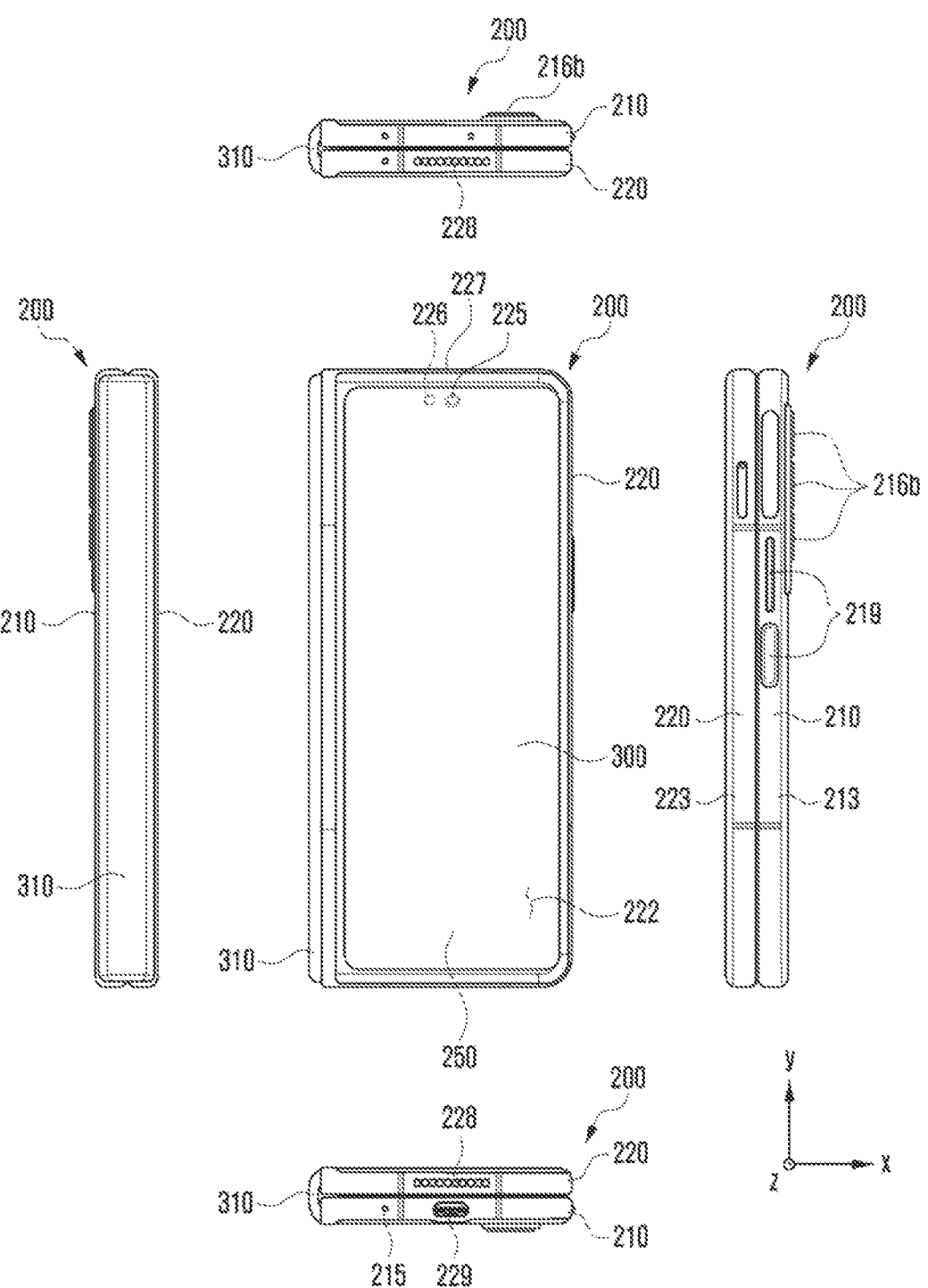
FIG. 2A is a front, side, top and bottom view of a folded state of an electronic device according to various embodiments of the disclosure.
Figure 2B:
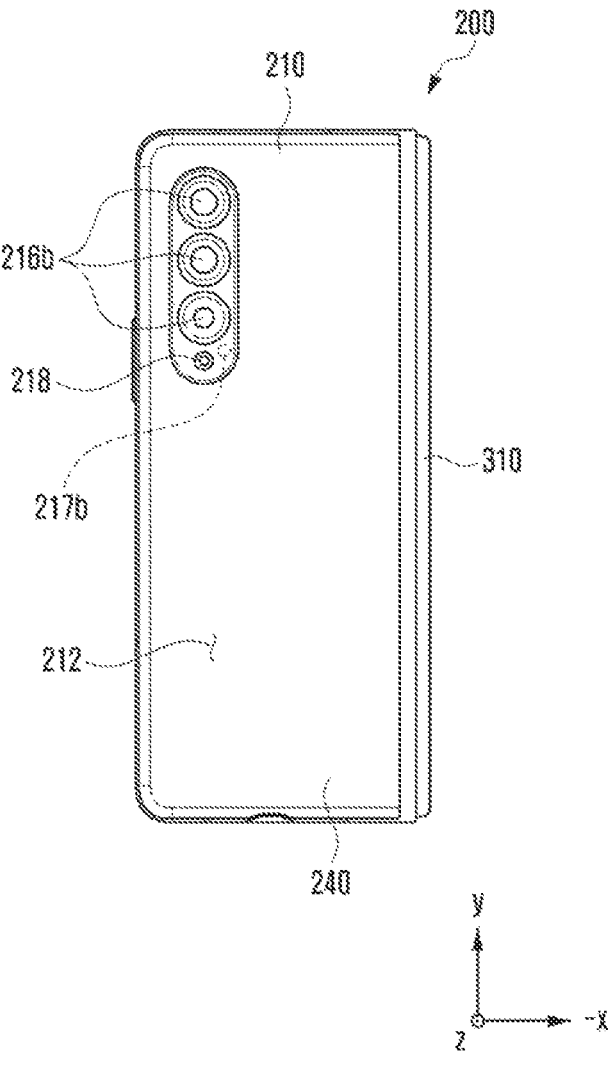
FIG. 2B is a rear view of a folded state of an electronic device according to various embodiments of the disclosure.

FIGS. 1A and 1B are diagrams illustrating a front view and a rear view, respectively, of an unfolded state of an electronic device according to various embodiments. FIGS. 2A and 2B are diagrams illustrating a front view and a rear view, respectively, of a folded state of an electronic device according to various embodiments.

Referring to FIGS. 1A, 1B, 2A and 2B (which may be referred to as FIGS. 1A to 2B), an electronic device 200 may include a pair of housings 210 and 220 (e.g., a foldable housing structure) rotatably coupled to each other with reference to folding axis A through a hinge device (e.g., a hinge device 320 of FIG. 3) (e.g., a hinge module) so as to be folded with respect to each other, a first display 230 (e.g., a flexible display, a foldable display, or a main display) disposed through the pair of housings 210 and 220, and/or a second display 300 (e.g., a sub display) disposed through the second housing 220. According to an embodiment, at least a part of the hinge device (e.g., the hinge device 320 of FIG. 3) may be disposed so as not to be seen from the outside through the first housing 210 and the second housing 220, and may be disposed so as not to be seen from the outside through the hinge housing 310 covering a foldable portion. According to an embodiment, the hinge device 320 may include a hinge module including a gear assembly including multiple gears and multiple hinge cams which are coupled to hinge shafts rotating through the gear assembly and perform a cam interlocking operation, and hinge plates for connecting the hinge model to the first housing 210 and the second housing 220. In the disclosure, a surface in which the first display 230 is disposed may be defined as a front surface of the electronic device 200, and a surface opposite to the front surface may be defined as a rear surface of the electronic device 200. In addition, a surface surrounding a space between the front surface and the rear surface may be defined as a side surface of the electronic device 200.

According to various embodiments, the pair of housings 210 and 220 may include a first housing 210 and a second housing 220 foldably arranged with respect to each other through the hinge device (e.g., the hinge device 320 of FIG. 3). According to an embodiment, the shape and the coupling of the pair of housings 210 and 220 are not limited to those illustrated in FIGS. 1A to 2B, and the pair of housings 210 and 220 may be implemented by a combination and/or coupling of other shapes or components. According to an embodiment, the first housing 210 and the second housing 220 may be arranged on opposite sides with reference to the folding axis A, and may have shapes that are entirely symmetric to each other with respect to the folding axis A. According to an embodiment, the first housing 210 and the second housing 220 may be asymmetrically folded with reference to the folding axis A. According to an embodiment, the angle or the distance between the first housing 210 and the second housing 220 may vary depending on whether the electronic device 200 is in an unfolded state, a folded state, or an intermediate state.

According to various embodiments, the first housing 210 may include, in the unfolded state of the electronic device 200, a first surface 211 connected to the hinge device (e.g., the hinge device 320 of FIG. 3) and disposed to be oriented to the front surface of the electronic device 200, a second surface 212 oriented in a direction opposite to the first surface 211, and/or a first side member 213 surrounding at least a part of a first space between the first surface 211 and the second surface 212. According to an embodiment, the second housing 220 may include, in the unfolded state of the electronic device 200, a third surface 221 connected to the hinge device (e.g., the hinge device 320 of FIG. 3) and disposed to be oriented to the front surface of the electronic device 200, a fourth surface 222 oriented in a direction opposite to the third surface 221, and/or a second side member 223 surrounding at least a part of a second space between the third surface 221 and the fourth surface 222. According to an embodiment, the first surface 211 and the third surface 221 may be oriented in substantially the same direction in the unfolded state, and the first surface 211 and the third surface 221 may at least partially face each other in the folded state. According to an embodiment, the electronic device 200 may include a recess 201 formed to receive the first display 230 through structural coupling of the first housing 210 and the second housing 220. According to an embodiment, the recess 201 may have substantially the same shape as the first display 230. According to an embodiment, the first housing 210 may include a first protection frame 213a (e.g., a first decoration member) which is, when seen from above the first display 230, coupled to the first side member 213, disposed to overlap with an edge of the first display 230, so as to cover the edge of the first display 230 to allow the same not to be seen from the outside. According to an embodiment, the first protection frame 213a may be integrally formed with the first side member 213. According to an embodiment, the second housing 220 may include a second protection frame 223a (e.g., a second decoration member) which is, when seen from above the first display 230, coupled to the second side member 223, disposed to overlap with an edge of the first display 230, so as to cover the edge of the first display 230 to allow the same not to be seen from the outside. According to an embodiment, the second protection frame 223a may be integrally formed with the second side member 223. In an embodiment, the first protection frame 213a and the second protection frame 223a may be omitted.

According to various embodiments, the hinge housing 310 (e.g., a hinge cover) may be disposed between the first housing 210 and the second housing 220, and may be disposed to cover a part (e.g., at least one hinge module) of the hinge device (e.g., the hinge device 320 of FIG. 3) disposed on the hinge housing 310. According to an embodiment, the hinge housing 310 may be hidden or exposed from or to the outside by a part of the first housing 210 and the second housing 220 according to the unfolded state, the folded state, or the intermediate state of the electronic device 200. For example, when the electronic device 200 is in the unfolded state, at least a part of the hinge housing 310 may be covered by the first housing 210 and the second housing 220 and not be substantially exposed. According to an embodiment, when the electronic device 200 is in the folded state, at least a part of the hinge housing 310 may be exposed to the outside between the first housing 210 and the second housing 220. According to an embodiment, in the intermediate state in which the first housing 210 and the second housing 220 are folded with each other by a predetermined angle (folded with a certain angle), the hinge housing 310 may be at least partially exposed to the outside of the electronic device 200 between the first housing 210 and the second housing 220. For example, an area in which the hinge housing 310 is exposed to the outside, may be smaller than that in a case in which the electronic device 200 is completely folded. According to an embodiment, the hinge housing 310 may include a curved surface.

According to various embodiments, when the electronic device 200 is in the unfolded state (e.g., the states shown in FIGS. 1A and 1B), the first housing 210 and the second housing 220 may meet at an about 180-degree angle, and a first area 230a, a second area 230b, and a folding area 230c of the first display 230 may form the same plane and arranged to be oriented in substantially the same direction (e.g., a z-axis direction). In an embodiment, when the electronic device 200 is in the unfolded state, the first housing 210 may rotate by an about 360-degree angle with respect to the second housing 220, and may be outwardly folded (an out-folding scheme) so that the second surface 212 and the fourth surface 222 face each other.

According to various embodiments, when the electronic device 200 is in the folded state (e.g., the states shown in FIGS. 2A and 2B), the first surface 211 of the first housing 210 and the third surface 221 of the second housing 220 may be arranged to face each other. In this case, the first area 230a and the second area 230b of the first display 230 may form a narrow angle (e.g., a range between 0 degrees to about 10 degrees) through the folding area 230c, and may be arranged to face each other. According to an embodiment, at least a part of the folding area 230c may be deformed into a curved shape having a predetermined curvature. According to an embodiment, when the electronic device 200 is in the intermediate state, the first housing 210 and the second housing 220 may be arranged at a predetermined angle (a certain angle). In this case, the first area 230a and the second area 230b of the first display 230 may form an angle that is greater than that in the folded state and smaller than that in the unfolded state, and the curvature of the folding area 230c may be lower than that in the folded state, and may be higher than that in the unfolded state. In an embodiment, the first housing 210 and the second housing 220 may form an angle which allows stopping at a designated folding angle between the folded state and the unfolded state (a free stop function), through the hinge device (e.g., the hinge device 320 of FIG. 3). In an embodiment, the first housing 210 and the second housing 220 may continuously operate while being pressed in an unfolding direction or a folding direction with reference to a designated inflection angle, through the hinge device (e.g., the hinge device 320 of FIG. 3).

According to various embodiments, the electronic device 200 may include at least one of at least one display 230 and 300 disposed on the first housing 210 and/or the second housing 220, an input device 215, sound output devices 227 and 228, sensor modules 217a, 217b, and 226, camera modules 216a, 216b, and 225, a key input device 219, an indicator, or a connector port 229. In an embodiment, the electronic device 200 may omit at least one of the elements, or may additionally include at least one another element.

According to various embodiments, the at least one display 230 and 300 may include a first display 230 (e.g., a flexible display) disposed to be supported by the third surface 221 of the second housing 220 from the first surface 211 of the first housing 210 through the hinge device (e.g., the hinge device 320 of FIG. 3), and a second display 300 disposed to be at least partially seen from the outside through the fourth surface 222 in a space in the second housing 220. In an embodiment, the second display 300 may be disposed to be seen from the outside through the second surface 212 in a space in the first housing 210. According to an embodiment, the first display 230 may be mainly used in the unfolded state of the electronic device 200, and the second display 300 may be mainly used in the folded state of the electronic device 200. According to an embodiment, the electronic device 200 may control, in the intermediate state, the first display 230 and/or the second display 300 to be used, based on a folding angle between the first housing 210 and the second housing 220.

According to various embodiments, the first display 230 may be disposed in a receiving space formed by the pair of housings 210 and 220. For example, the first display 230 may be disposed in a recess 201 formed by the pair of housings 210 and 220, and may be disposed to occupy substantially the most of the front surface of the electronic device 200 in the unfolded state. According to an embodiment, the first display 230 may include a flexible display having at least one area which can be deformed into a plane or a curved surface. According to an embodiment, the first display 230 may include the first area 230a facing the first housing 210 and the second area 230b facing the second housing 220. According to an embodiment, the first display 230 may include the folding area 230c including a part of the first area 230a and a part of the second area 230b with respect to the folding axis A. According to an embodiment, at least a part of the folding area 230c may include an area corresponding to the hinge device (e.g., the hinge device 320 of FIG. 3). According to an embodiment, a division of an area of the first display 230 merely corresponds to an example physical division by the pair of housings 210 and 220 and the hinge device (e.g., the hinge device 320 of FIG. 3), and the first display 230 may be substantially displayed as one seamless full screen through the pair of the housings 210 and 220 and the hinge device (e.g., the hinge device 320 of FIG. 3). According to an embodiment, the first area 230a and the second area 230b may have shapes that are entirely symmetric or partially asymmetric to each other with respect to the folding area 230c.

According to various embodiments, the electronic device 200 may include a first rear cover 240 disposed on the second surface 212 of the first housing 210 and a second rear cover 250 disposed on the fourth surface 222 of the second housing 220. In an embodiment, at least a part of the first rear cover 240 may be integrally formed with the first side member 213. In an embodiment, at least a part of the second rear cover 250 may be integrally formed with the second side member 223. According to an embodiment, at least one of the first rear cover 240 and the second rear cover 250 may be substantially formed of a transparent plate (e.g., a polymer plate or glass plate including various coding layers) or an opaque plate. According to an embodiment, the first rear cover 240 may be formed of, for example, an opaque plate such as coded or colored glass, ceramic, polymer, metal (e.g., aluminum, stainless steel (STS), or magnesium), or a combination of at least two of the materials above. According to an embodiment, the second rear cover 250 may be substantially formed of, for example, a transparent plate such as glass or polymer. Accordingly, the second display 300 may be disposed to be seen from the outside through the second rear cover 250 in a space in the second housing 220.

According to various embodiments, the input device 215 may include a microphone. In an embodiment, the input device 215 may include multiple microphones arranged to detect the direction of sound. According to an embodiment, the sound output devices 227 and 228 may include speakers. According to an embodiment, the sound output devices 227 and 228 may include a call receiver 227 disposed through the fourth surface 222 of the second housing 220 and an external speaker 228 disposed through at least a part of the second side member 223 of the second housing 220. In an embodiment, the input device 215, the sound output devices 227 and 228, and the connector 229 may be disposed in spaces of the first housing 210 and/or the second housing 220, and may be exposed to an external environment through at least one hole formed through the first housing 210 and/or the second housing 220. In an embodiment, holes formed through the first housing 210 and/or the second housing 220 may be commonly used for the input device 215 and the sound output devices 227 and 228. In an embodiment, the sound output devices 227 and 228 may include a speaker (e.g., a piezo speaker) operating without including a hole formed through the first housing 210 and/or the second housing 220.

According to various embodiments, the camera modules 216a, 216b, and 225 may include a first camera module 216a disposed on the first surface 211 of the first housing 210, a second camera module 216b disposed on the second surface 212 of the first housing 210, and/or a third camera module 225 disposed on the fourth surface 222 of the second housing 220. According to an embodiment, the electronic device 200 may include a flash 218 disposed around the second camera module 216b. According to an embodiment, the flash 218 may include, for example, a light-emitting diode or a xenon lamp. According to an embodiment, the camera modules 216a, 216b, and 225 may include one or multiple lenses, an image sensor, and/or an image signal processor. In an embodiment, at least one of the camera modules 216a, 216b, and 225 may include two or more lenses (e.g., wide-angle and telephoto lenses) and image sensors, and may be arranged together on one surface of the first housing 210 and/or the second housing 220.

According to various embodiments, the sensor modules 217a, 217b, and 226 may generate a data value or an electrical signal corresponding to an internal operational state or an external environmental state of the electronic device 200. According to an embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In an embodiment, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (e.g., a time of flight (TOF) sensor or a light detection and ranging (LiDAR)).

According to various embodiments, the electronic device 200 may further include an unillustrated sensor module, for example, at least one of an atmospheric sensor, a magnetic sensor, a biometric sensor, a temperature sensor, a humidity sensor, or a fingerprint recognition sensor. In an embodiment, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In an embodiment, the key input device 219 may be disposed to be exposed to the outside through the second side member 223 of the second housing 220. In an embodiment, the electronic device 200 may not include some or all of the key input device 219, and the key input device 219 may be implemented in another shape such as a soft key on the least one display 230 and 300. In an embodiment, the key input device 219 may be implemented using a pressure sensor included in the at least one display 230 and 300.

According to various embodiments, the connector port 229 may include a connector (e.g., a USB connector or an IF module (an interface connector port module)) for transmitting or receiving data and/or power to and/or from an external electronic device. In an embodiment, the connector port 229 may perform a function of transmitting or receiving an audio signal to or from the external electronic device together, or may further include a separate connector port (e.g., an ear jack hole) for performing a function of transmitting or receiving an audio signal to or from the external electronic device.

According to various embodiments, at least one camera modules 216a and 225 of the camera modules 216a, 216b, and 225, at least one sensor module 217a and 226 of the sensor modules 217a, 217b, and 226, and/or an indicator may be arranged to be exposed through the at least one display 230 and 300. For example, the at least one camera modules 216a and 225, the at least one sensor module 217a and 226, and/or the indicator may be arranged under an activated area (a display area) of the at least one display 230 and 300 in a space in the at least one housing 210 and 220, and may be arranged to come into contact with an external environment through a transparent area or an opening that is perforated to a cover member (e.g., a window layer of the first display 230 and/or the second rear cover 250). According to an embodiment, an area in which the at least one display 230 and 300 and the at least one camera module 216a and 225 face each other may be formed as a transmission area having a predetermined transmission ratio, as a part of an area in which a content is displayed. According to an embodiment, the transmission area may be formed to have a transmission ratio in the range of about 5% to about 20%. The transmission area may include an area overlapping with an effective area (e.g., an angle of view area) of the at least one camera module 216a and 225, wherein an image is formed on the image sensor in the effective area, and light for generating an image passes through the effective area. For example, the transmission area of the display 230 and 300 may include an area in which the density of a pixel is lower than that in a surrounding area. For example, the transmission area may be replaced with an opening. For example, the at least one camera module 216a and 225 may include an under-display camera (UDC) or an under-panel camera (UPC). In an embodiment, some camera modules or sensor modules 271a and 226 may be arranged to perform functions thereof without being visually exposed through the display. For example, an area facing the sensor module 217a and 226 and/or the camera module 216a and 225 arranged under the display 230 and 300 (e.g., a display panel) corresponds to an under-display camera (UDC) structure, and a perforated opening is not necessarily required.

Figure 3A:
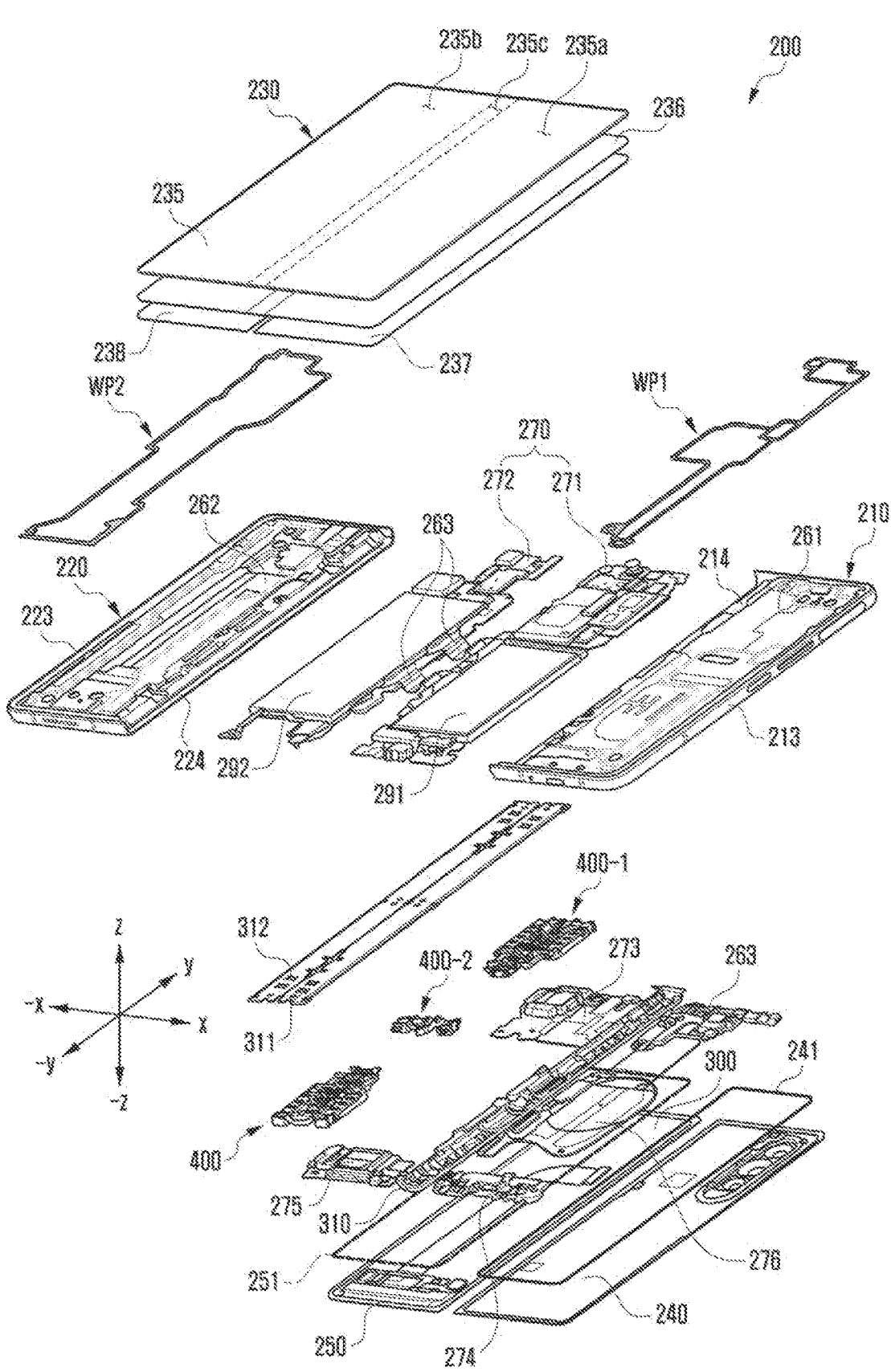
FIG. 3A is an exploded perspective view of an electronic device according to various embodiments of the disclosure.
Figure 3B:
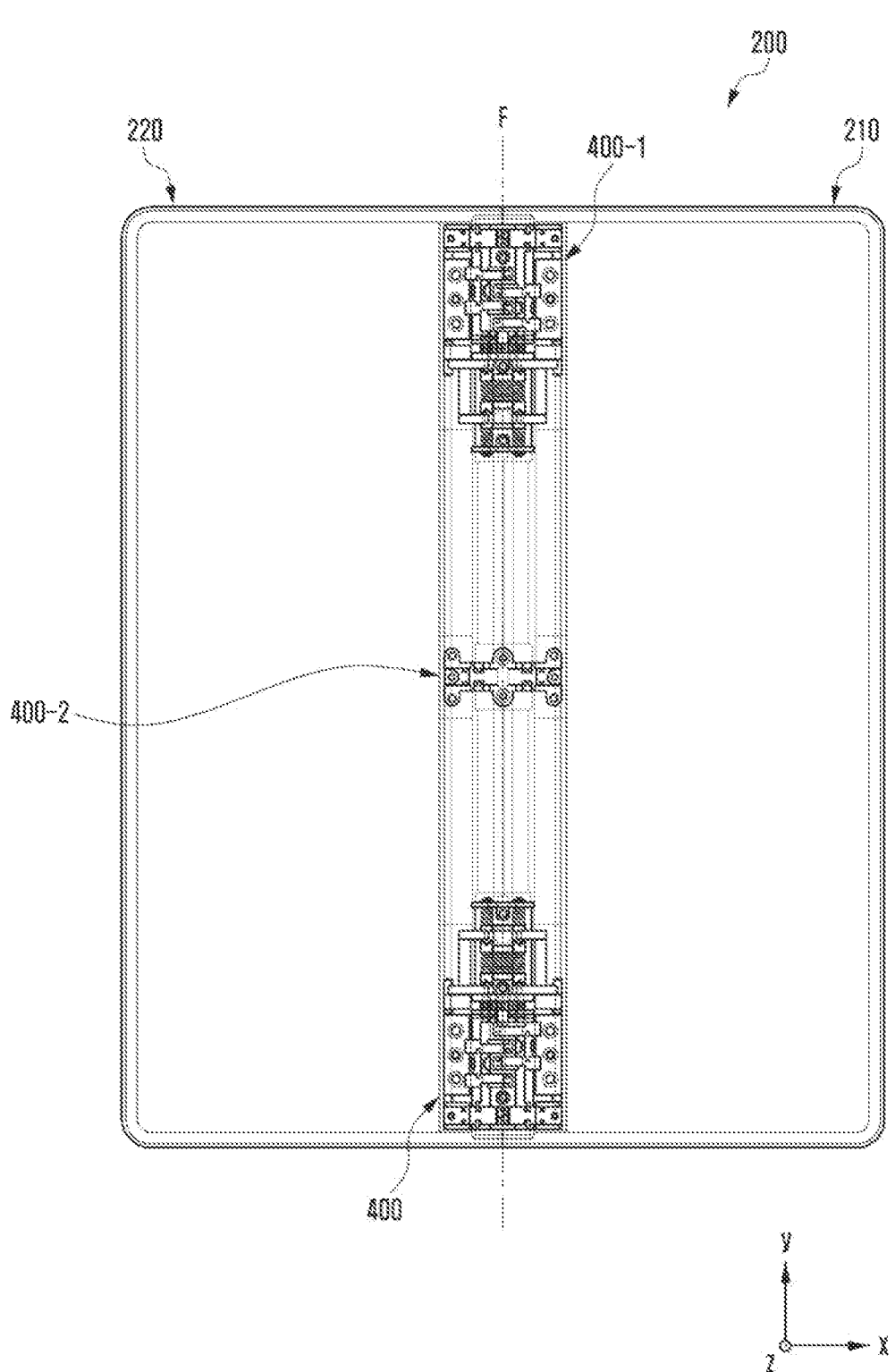
FIG. 3B illustrates an arrangement structure of hinge devices in an electronic device according to various embodiments of the disclosure.

FIG. 3A is an exploded perspective view of the electronic device 200 according to various embodiments of the disclosure. FIG. 3B illustrates an arrangement structure of hinge devices in an electronic device according to various embodiments of the disclosure.

Referring to FIGS. 3A and 3B, the electronic device 200 may include a first display 230 (e.g., a flexible display), a second display 300, at least one hinge device 400 and 400-1, and a pair of support members 261 and 262, at least one substrate 270 (e.g., a printed circuit board (PCB)), a first housing 210, a second housing 220, a first rear cover 240, and/or a second rear cover 250.

According to various embodiments, the first display 230 may include a display panel 235 (e.g., a flexible display panel) and a support plate 236 disposed under the display panel 235. According to an embodiment, the first display 230 may include a pair of reinforcing plates 237 and 238 disposed under the supporting plate 236. In some embodiments, the pair of reinforcing plates 237 and 238 may be omitted. According to an embodiment, the display panel 235 may include a first panel area 235a corresponding to a first area (e.g., the first area 230a in FIG. 1A) of the first display 230, a second panel area 235b extending from the first panel area 235a and corresponding to a second area (e.g., the second area 230b in FIG. 1A) of the first display 230, and a third panel area 235c connecting the first panel area 235a and the second panel area 235b and corresponding to a folding area (e.g., the folding area 230c in FIG. 1A) of the first display 230. According to an embodiment, the support plate 236 may be disposed between the display panel 235 and the pair of support members 261 and 262 and may be formed to have a material and shape for providing a planar support structure for the first panel area 235a and the second panel area 235b. and for providing a bendable structure for advantageously providing the flexibility to the third panel area 235c. According to an embodiment, the support plate 236 may be formed of a conductive material (e.g., metal) or a non-conductive material (e.g., a polymer or fiber reinforced plastic (FRP)). According to an embodiment, the pair of reinforcing plates 237 and 238 may be disposed between the support plate 236 and the pair of support members 261 and 262 and may include the first reinforcing plate 237 disposed to correspond to at least a part of the first panel area 235a and third panel area 235c, and the second reinforcing plate 238 disposed to correspond to at least a part of the second panel area 235b and the third panel area 235c.

According to an embodiment, the pair of reinforcing plates 237 and 238 may be formed of a metal material (e.g., SUS) to advantageously reinforce a ground connection structure and rigidity for the first display 230.

According to various embodiments, the second display 300 may be disposed in a space between the second housing 220 and the second rear cover 250. According to an embodiment, the second display 300 may be visible from the outside through substantially the entire area of the second rear cover 250 while being in the space between the second housing 220 and the second rear cover 250.

According to various embodiments, at least a part of the first support member 261 may be foldably coupled to the second support member 262 through at least one hinge device 400 and 400-1. According to one embodiment, the electronic device 200 may include at least one wiring member 263 (e.g., a flexible printed circuit board (FPCB)) disposed from at least a part of the first support member 261 to a part of the second support member 262 across the at least one hinge device 400 and 400-1. According to an embodiment, the first support member 261 may extend from the first lateral member 213 or may be structurally combined with the first lateral member 213. According to an embodiment, the electronic device 200 may include a first space (e.g., the first space 2101 in FIG. 1A) provided through the first support member 261 and the first rear cover 240. According to an embodiment, the first housing 210 (e.g., the first housing structure) may be configured through a combination of the first lateral member 213, the first support member 261, and the first rear cover 240. According to an embodiment, the second support member 262 may extend from the second lateral member 223 or may be structurally combined with the second lateral member 223. According to an embodiment, the electronic device 200 may include a second space (e.g., the second space 2201 in FIG. 1A) provided through the second support member 262 and the second rear cover 250. According to an embodiment, the second housing 220 (e.g., the second housing structure) may be configured through a combination of the second lateral member 223, the second support member 262, and the second rear cover 250. According to an embodiment, at least a part of the at least one wiring member 263 and/or at least one hinge device 400 and 400-1 may be disposed to be supported through at least a part of the pair of support members 261 and 262. According to an embodiment, at least one wiring member 263 may be disposed in a direction (e.g., the x-axis direction) crossing the first support member 261 and the second support member 262. According to an embodiment, the at least one wiring member 263 may be arranged to have a length in a direction (e.g., the x-axis direction) substantially perpendicular to a folding axis (e.g., the y-axis or the folding axis A in FIG. 1A).

According to various embodiments, the at least one substrate 270 may include a first substrate 271 disposed in the first space 2101 and a second substrate 272 disposed in the second space 2201. According to an embodiment, the first substrate 271 and the second substrate 272 may include a plurality of electronic components arranged to implement various functions of the electronic device 200. According to an embodiment, the first substrate 271 and the second substrate 272 may be electrically connected through at least one wiring member 263.

According to various embodiments, the electronic device 200 may include at least one battery 291 and 292. According to an embodiment, the at least one battery 291 and 292 may include a first battery 291 disposed in the first space 2101 of the first housing 210 and electrically connected to the first substrate 271, and a second battery disposed in the second space 2201 of the second housing 220 and electrically connected to the second substrate 272. According to an embodiment, the first support member 261 and the second support member 262 may further include at least one swelling hole for the first battery 291 and the second battery 292.

According to various embodiments, the first housing 210 may include a first rotation support surface 214, and the second housing 220 may include a second rotation support surface 224 corresponding to the first rotation support surface 214. According to an embodiment, the first rotation support surface 214 and the second rotation support surface 224 may include a curved surface corresponding to (naturally connected to) the curved outer surface of the hinge housing 310. According to an embodiment, when the electronic device 200 is in an unfolded state, the first rotation support surface 214 and the second rotation support surface 224 may cover the hinge housing 310 to prevent the hinge housing 310 from being exposed from the rear surface of the electronic device 200 or to expose only a part of the hinge housing 310. According to an embodiment, when the electronic device 200 is in a folded state, the first rotation support surface 214 and the second rotation support surface 224 may rotate along the curved outer surface of the hinge housing 310 and at least partially expose the hinge housing 310 from the rear surface of the electronic device 200.

According to various embodiments, the electronic device 200 may include at least one antenna 276 disposed in the first space 2101. According to an embodiment, at least one antenna 276 may be disposed on the first battery 291 and the first rear cover 240 in the first space 2101. According to an embodiment, the at least one antenna 276 may include, for example, a near field communication (NFC) antenna, a wireless charging antenna, and/or a magnetic secure transmission (MST) antenna. According to an embodiment, the at least one antenna 276 may, for example, perform short-range communication with an external device or wirelessly transmit/receive power required for charging. In some embodiments, the antenna structure may be formed by at least a part of the first lateral member 213 or the second lateral member 223 and/or a part of the first support member 261 and the second support member 262 or a combination thereof.

According to various embodiments, the electronic device 200 may further include at least one electronic component assembly 274 and 275 and/or additional support members 263 and 273 disposed in the first space 2101 and/or the second space 2201. For example, at least one electronic component assembly may include an interface connector port assembly 274 or a speaker assembly 275.

According to various embodiments, the electronic device 200 may include a first waterproof member (WP1) disposed between the first reinforcing plate 237 and the first support member 261 and a second waterproof member (WP2) disposed between the second reinforcing plate 238 and the second support member 262. According to an embodiment, the first waterproof member (WP1) may provide at least one first waterproof space while being disposed between the first reinforcing plate 237 and the first support member 261. According to an embodiment, at least one first waterproof space may accommodate an area corresponding to at least one electronic component (e.g., a camera module or a sensor module) disposed to be supported by the first support member 261. According to an embodiment, the second waterproof member (WP2) may provide a second waterproof space while being disposed between the second reinforcing plate 238 and the second support member 262. According to an embodiment, the second waterproof space may accommodate at least a part of the bending part which is folded toward the rear surface of the first display 230. For example, the second waterproof space may extend from the display panel of the first display 230 and may be disposed to surround at least a part of the bending part which is folded toward the rear surface thereof. Therefore, a control circuit (e.g., a display driver IC (DDI)) and a plurality of electric elements disposed in the bending part may be disposed in the second waterproof space to be protected from external moisture and/or foreign substances.

According to various embodiments, the electronic device 200 may include a waterproof tape 241 disposed between the first rear cover 240 and the first housing 210. According to an embodiment, the electronic device 200 may include a bonding member 251 disposed between the second rear cover 250 and the second housing 220. In some embodiments, the bonding member 251 may be disposed between the second display 300 and the second housing 220. In some embodiments, the waterproof tape 241 may be replaced with the bonding member 251, and the bonding member 251 may be replaced with the waterproof tape 241.

According to various embodiments, at least one hinge device 400 and 400-1 may include a first hinge device 400 and a second hinge device 400-1 disposed at one end and the other end in a direction parallel to the folding axis (F), respectively. According to an embodiment, the first hinge device 400 and the second hinge device 400-1 may have substantially the same configuration. According to an embodiment, the electronic device 200 may include a connection module 400-2 disposed between the first hinge device 400 and the second hinge device 400-1. According to an embodiment, the connection module 400-2 may be arranged through a combination of one or more gears and/or a combination of one or more links. In some embodiments, the connection module 400-2 may be replaced with the first hinge device 400. In some embodiments, at least one hinge device 400 and 400-1 may be disposed at one location or three or more locations at designated intervals along a direction parallel to the folding axis (F). According to an embodiment, the electronic device 200 may include a first hinge plate 311 and a second hinge plate 312 connected through at least one hinge device 400 and 400-1. According to an embodiment, the first hinge plate 311 may form the same plane as the first housing 210 in an unfolded state, and the second hinge plate 312 may form the same plane as the second housing 220 in an unfolded state. According to an embodiment, in a folded state, the flexible display 230 maybe deformed into a waterdrop shape through at least one hinge device 400 and 400-1 and accommodated in the inner space of the electronic device 200. According to an embodiment, in the folded state, the first hinge plate 311 and the second hinge plate 312 may be moved to support at least a part of the folding area (e.g., the folding area 230c in FIG. 1A) of the flexible display 230, which is deformed into a waterdrop shape, and in the folded state, the first housing 210 and the second housing 220 may be moved to support substantially undeformed flat parts (e.g., the first area 230a and the second area 230b in FIG. 1A) of the flexible display 230. Therefore, the first hinge plate 311 may not form the same plane as the first housing 210 in a folded state, and the second hinge plate 312 may not also form the same plane as the second housing 220.

The at least one hinge device 400 and 400-1 according to exemplary embodiments of the disclosure may be configured to induce the folding area 230c to be deformed into a designated shape (e.g., a waterdrop shape) in the folded state of the flexible display 230. For example, the first housing 210 and the second housing 220 may need to be designed to be rotated about axes (e.g., rotational axes (A1, A2) in FIG. 4B) that rotate with respect to positions different from the folding axis (F) of the flexible display 230 to enable the folding area 230c of the flexible display 230 to be deformable into a curved shape. In this case, if the first housing 210 and the second housing 220 are rotated about fixed rotational axes, the folding area 230c of the flexible display 230, which needs to form a waterdrop shape, may be compressed during the folding operation, and as a result, buckling of the display may occur. In order to solve the buckling problem, when transitioning from a folded state to an unfolded state or from an unfolded state to a folded state is performed through the hinge device 400 or 400-1 according to an exemplary embodiment of the disclosure, the rotational axes (A1, A2) of the first housing 210 and the second housing 220 may be moved by at least a length by which the compressive force applied to the flexible display 230 is relieved, thereby facilitating smooth deformation of the folding area 230c.

Figure 4A:
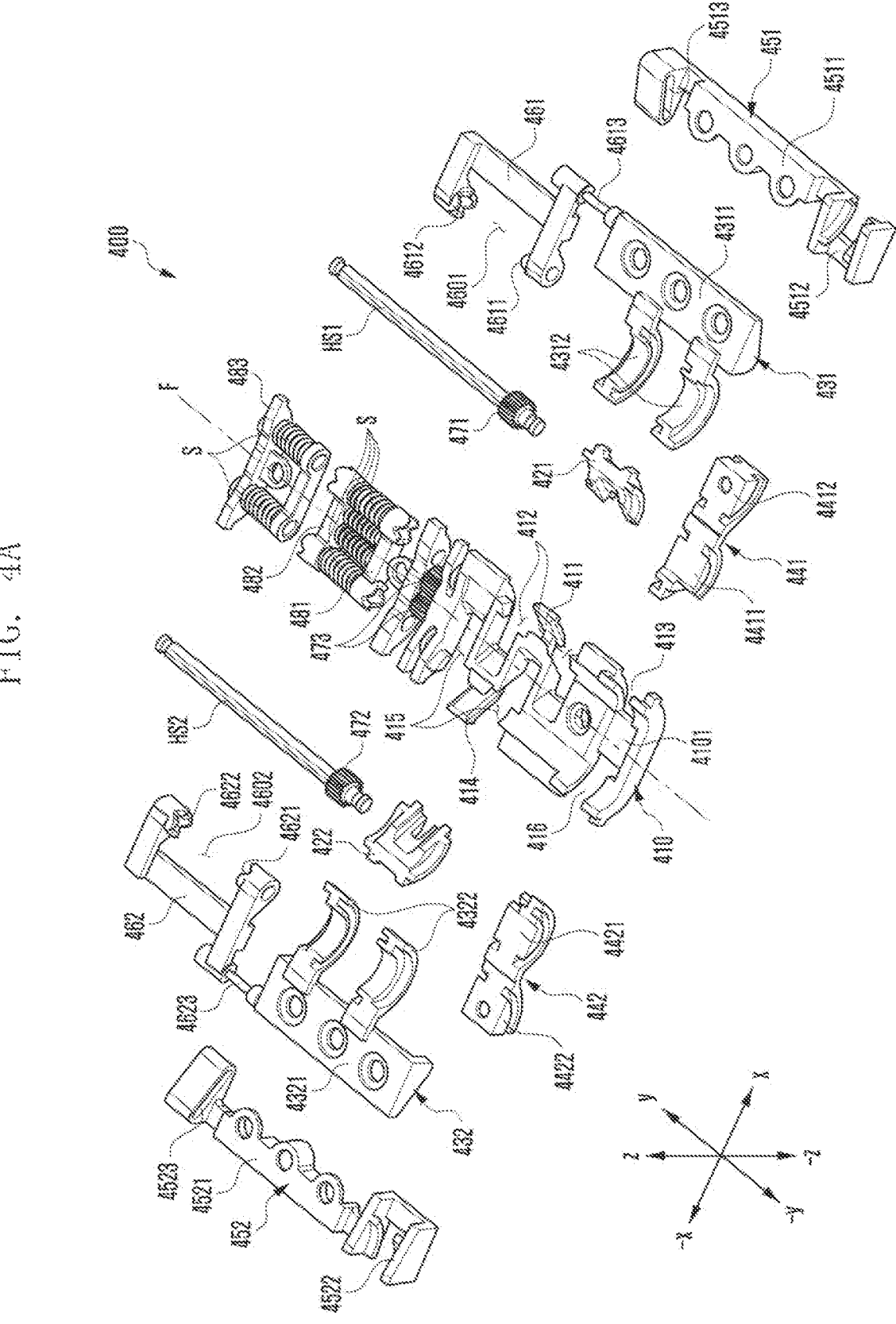
FIG. 4A is an exploded perspective view of a hinge device according to various embodiments of the disclosure.
Figure 4B:
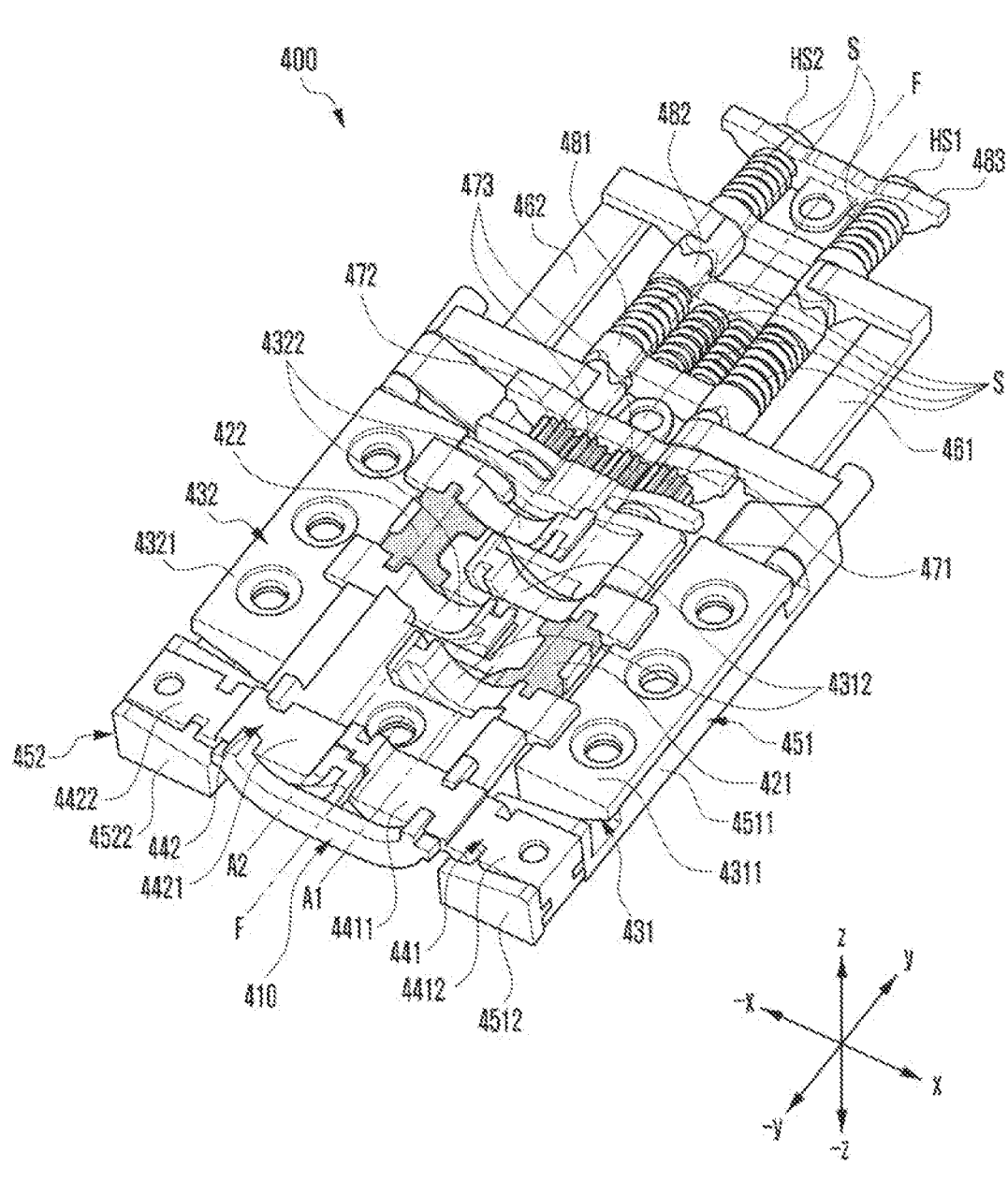
FIG. 4B is a perspective view of a combined hinge device according to various embodiments of the disclosure.

FIG. 4A is an exploded perspective view of a hinge device according to various embodiments of the disclosure. FIG. 4B is a perspective view of a combined hinge device according to various embodiments of the disclosure.

Referring to FIGS. 4A and 4B, the hinge device 400 may include a hinge bracket 410, a first slide rail 421 disposed to be movable with respect to one side of the hinge bracket 410 by a designated reciprocating distance around to the folding axis (F), a second slide rail 422 disposed to be movable with respect to the other side of the hinge bracket 410 by a designated reciprocating distance, a first rotator 431 rotatably coupled to the first slide rail 421, a second rotator 432 rotatably coupled to the second slide rail 422, a first housing bracket 451 configured to fix the first rotator 431 to the first housing (e.g., the first housing 210 in FIG. 3A), a second housing bracket 452 configured to fix the second rotator 432 to the second housing (e.g., the second housing 220 in FIG. 3A), a first support rotator 441 having one end rotatably coupled to the hinge bracket 410 and the other end rotatably coupled to the first housing bracket 451, and a second support rotator 442 having one end rotatably coupled to the hinge bracket 410 and the other end rotatably coupled to the second housing bracket 452. According to an embodiment, the first hinge plate (e.g., the first hinge plate 311 in FIG. 3A) may be fixed to the first support rotator 441, and the second hinge plate (e.g., the second hinge plate 312 in FIG. 3A) may be fixed to the second support rotator 442. At least one of the components described above may be formed of a polymer material and/or a metal material.

According to various embodiments, the hinge bracket 410 may include a bracket body 4101 having a designated shape. According to an embodiment, in the bracket body 4101, the hinge bracket 410 may include a first rail receiving part 411 disposed at one side of the folding axis (F) and configured to movably receive the first slide rail 421, and a second rail receiving part 414 disposed on the other side thereof and configured to movably receive the second slide rail 422. According to an embodiment, the hinge bracket 410 may include first receiving parts 412 disposed at the left and right side of (i.e., on either side of) the first rail receiving part 411 and configured to receive at least a part of the first rotator 431, and second receiving parts 415 disposed at the left and right side of (i.e., on either side of) the second rail receiving part 414 and configured to receive at least a part of the second rotator 432. According to an embodiment, the first receiving parts 412 and the second receiving parts 415 only receive a part of the first rotator 431 and a part of the second rotator 432 which are interfered during the rotational motion of the first rotator 431 and the second rotator 432, and the first and second rotators 431 and 432 are not directly rotatably connected thereto. According to an embodiment, in the bracket body 4101, the hinge bracket 410 may include a third receiving part 413 configured to rotatably receive the first support rotator 441 and a fourth receiving part 416 configured to rotatably receive the second support rotator 442.

According to various embodiments, the first rotator 431 may include a rotator body 4311 and a pair of rotation parts 4312 extending from the rotator body 4311 at a predetermined interval. According to an embodiment, the pair of rotation parts 4312 may be rotatably coupled to the first slide rail 421 and be at least partially received in the first receiving parts 412 of the hinge bracket 410 during a rotational motion. According to an embodiment, the second rotator 432 may also include a rotator body 4321 and a pair of rotation parts 4322 extending from the rotator body 4321 at a predetermined interval. According to an embodiment, the pair of rotation parts 4322 may be rotatably coupled to the second slide rail 422 and be at least partially received in the second receiving parts 415 of the hinge bracket 410 during a rotational motion.

According to various embodiments, the first housing bracket 451 may include a fixed body 4511 fixed to the rotator body 4311 of the first rotator 431, a bracket rotation part 4512 disposed at one end of the fixed body 4511 and rotatably coupled to the second rotation part 4412 of the first support rotator 441, and a guide slit 4513 (e.g., a long hole) disposed at the other end of the fixed body 4511 and having a length to guide a hinge pin 4613 of a first arm 461 to be described later. According to an embodiment, the second housing bracket 452 may also include a fixed body 4521 fixed to the rotator body 4321 of the second rotator 432, a bracket rotation part 4522 disposed at one end of the fixed body 4521 and rotatably coupled to the second rotation part 4422 of the second support rotator 442, and a guide slit 4523 (e.g., a long hole) disposed at the other end of the fixed body 4521 and having a length to guide a hinge pin 4623 of a second arm 462 to be described later. In some embodiments, the first housing bracket 451 and the second housing bracket 452 may be omitted, and the bracket rotation parts 4512 and 4522 and the guide slits 4513 and 4523 may be disposed on the rotator bodies 4311 and 4321 of the first rotator 431 and the second rotator 432, respectively. In some embodiments, the first housing bracket 451 and the second housing bracket 452 may be replaced with corresponding parts of the first housing 210 and the second housing 220, formed through structural changes.

According to various embodiments, the first support rotator 441 may include a first rotation part 4411 rotatably coupled to the third receiving part 413 of the hinge bracket 410 and a second rotation part 4412 rotatably coupled to the bracket rotation part 4512 of the first housing bracket 451. According to an embodiment, the second support rotator 442 may also include a first rotation part 4421 rotatably coupled to the fourth receiving part 416 of the hinge bracket 410 and a second rotation part 4422 rotatably coupled to the bracket rotation part 4522 of the second housing bracket 452. According to an embodiment, the first support rotator 441 may be rotatably coupled to the hinge bracket 410 and the first housing bracket 451 through the pair of rotation parts 4411 and 4412, thereby receiving rotation and movement of the first rotational axis (A1) of the first rotator 431 which is moved by the first slide rail 421 while rotating. According to an embodiment, the second support rotator 442 may be rotatably coupled to the hinge bracket 410 and the second housing bracket 452 through the pair of rotation parts 4421 and 4422, thereby receiving rotation and movement of the second rotational axis (A2) of the second rotator 432 which is moved by the second slide rail 422 while rotating.

According to various embodiments, the electronic device 200 may include a gear assembly and a cam assembly connected to the hinge device 400. According to an embodiment, the gear assembly may include a first shaft (HS1) disposed to penetrate at least a part of the hinge bracket 410 and including a first gear 471, a second shaft (HS2) disposed to penetrate at least a part of the hinge bracket 410 and including a second gear 472, and at least two idle gears 473 disposed between the first gear 471 and the second gear 472. According to an embodiment, the at least two idle gears 473 may be gear-coupled to the first gear 471 and the second gear 473 (for example, gear-coupled in line) such that the first shaft (HS1) and the second shaft (HS2) rotate to have the same rotation amount. Through this gear assembly, when the electronic device 200 is folded or unfolded, the first housing 210 and the second housing 220 may be folded or unfolded at the same angle as each other. According to an embodiment, four or more idle gears 473, which are provided in even number, may also be arranged. In some embodiments, the gear assembly may be disposed separately from the hinge bracket 410.

According to various embodiments, the cam assembly may include a first cam structure body 481 and a second cam structure body 482 arranged such that the first shaft (HS1) and the second shaft (HS2) sequentially pass therethrough, and at least one spring (S) disposed between the two cam structure bodies 481 and 482 to outwardly press the cam structure bodies 481 and 482. According to an embodiment, the cam assembly may further include a support structure body 483 disposed adjacent to the second cam structure 482 such that the first shaft (HS1) and the second shaft (HS2) pass therethrough. In some embodiments, the support structure body 483 may be omitted. According to an embodiment, the cam assembly may include a first arm 461 including a first cam structure 4611 cam-coupled to the first cam structure body 481, and a second cam structure 4612 spaced apart from the first cam structure 4611 and cam-coupled to the second cam structure body 482. According to an embodiment, the first arm 461 may be disposed such that the first shaft (HS1) passes through the first cam structure 4611 and the second cam structure 4612, and a part of the first cam structure body 481 and a part of the second cam structure body 482 may be interposed in space 4601 between first cam structure 4611 and second cam structure 4612. According to an embodiment, the first arm 461 may be disposed such that the hinge pin 4613 disposed in a partial area thereof may move along the guide slit 4513 of the first housing bracket 451. For example, when the first housing bracket 451 is rotated about the first rotational axis (A1) together with the first housing 210, the first arm 461 may also be rotated together with the first shaft (HS1), and the first cam structure body 481 and the second cam structure body 482 disposed on the first shaft (HS1) to be movable only in the axial direction (e.g., the ±y-axis direction) may retreat while being pressed by the spring (S). As a result, the first housing 210 may be provided with a detent during operation, provided with a holding force to maintain the state at a predetermined intermediate angle, or provided with a pressing force in a folding direction or unfolding direction when rotation is made at an angle equal to or greater than a designated inflection angle. According to an embodiment, the cam assembly may include a second arm 462 including a first cam structure 4621 cam-coupled to the first cam structure body 481, and a second cam structure 4622 spaced apart from the first cam structure 4621 and cam-coupled to the second cam structure body 482. According to an embodiment, the second arm 462 may be disposed such that the second shaft (HS2) passes through the first cam structure 4621 and the second cam structure 4622, and a part of the first cam structure body 481 and a part of the second cam structure body 482 may be interposed in a space 4601 between the first cam structure 4621 and the second cam structure 4622. According to an embodiment, the second arm 462 may be disposed such that a hinge pin 4623 disposed in a partial area thereof may move along the guide slit 4523 of the second housing bracket 452. For example, when the second housing bracket 452 is rotated about the second rotational axis (A2) together with the second housing 220, the second arm 462 may also rotate together with the second shaft (HS2), and the first cam structure 481 and the second cam structure 482 disposed on the second shaft (HS2) to be movable only in the axial direction (e.g., the ±y-axis direction) may retreat while being pressed by the spring (S). As a result, the second housing 220 may be provided with a detent during operation, provided with a holding force to maintain the state at a predetermined intermediate angle, or provided with a pressing force in a folding direction or unfolding direction when rotation is made at an angle equal to or greater than a designated inflection angle. For example, due to the first housing 210 and the second housing 220 which are simultaneously folded or unfolded at the same angle through the gear assembly, the first arm 461 and the second arm 462 may also equally perform an operation.

According to various embodiments, the first arm 461 may rotate about the first shaft (HS1), and the first rotator 431 may rotate about the rotational axis (A1) different from that of the first shaft (HS1). Therefore, during the folding or unfolding operation of the first housing 210, the first arm 461 rotated together with the first rotator 431 may be moved along the guide slit 4513 disposed through the first housing bracket 451 through the hinge pin 4613. Similarly, the second arm 462 may also be moved along the guide slit 4523 disposed through the second housing bracket 452 through the hinge pin 4623. For example, due to the first rotational axis (A1) and the second rotational axis (A2) of the rotators 431 and 432 which are moved during a folding or unfolding operation, the guide slits 4513 and 4523 may have a sufficient length to correspond to the movement of the rotational axes (A1, A2).

According to various embodiments, the first housing 210 may be fixed to the first housing bracket 451 and the second housing 220 may be fixed to the second housing bracket 452. According to an embodiment, the first hinge plate 311 may be fixed to the first support rotator 441 and the second hinge plate 312 may be fixed to the second support rotator 442. According to an embodiment, in an unfolded state, the first housing 210, the first hinge plate 311, the second hinge plate 312, and the second housing 220 may form the same plane to support the flexible display 230. According to an embodiment, in a folded state, the first housing 210 may be rotated about the first rotational axis (A1) through the first rotator 431 to support a first flat area (e.g., the first area 230a in FIG. 1A) of the flexible display 230, and the second housing 220 may be rotated about the second rotational axis (A2) through the second rotator 432 to support a second flat area (e.g., the second area 230b in FIG. 1A) of the flexible display 230. According to an embodiment, in the folded state, the first hinge plate 311 and the second hinge plate 312 may be folded further inward to each other through the first support rotator 441 and the second support rotator 442, thereby supporting the folding area (e.g., the folding area 230c in FIG. 1A) of the flexible display 230, which is deformed into a waterdrop shape. According to an embodiment, the first rotational axis (A1) and the second rotational axis (A2) may be moved in a designated direction from a first point (e.g., the first point (P1) in FIG. 10G) to a second point (e.g., the second point (P2) in FIG. 10G) through the first slide rail 421 and the second slide rail 422 during the folding operation, thereby reducing the compressive force applied to the flexible display 230 and reducing unintentional deformation (e.g., buckling) of the flexible display 230.

Figure 5A:
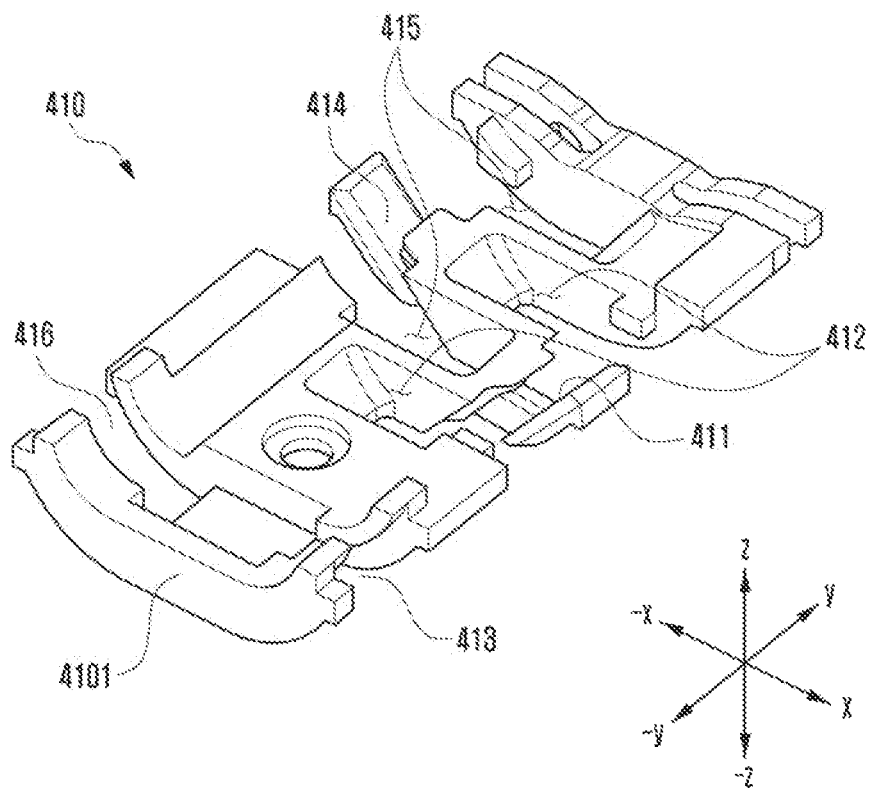
FIG. 5A is a perspective view of a hinge bracket according to various embodiments of the disclosure.
Figure 5B:
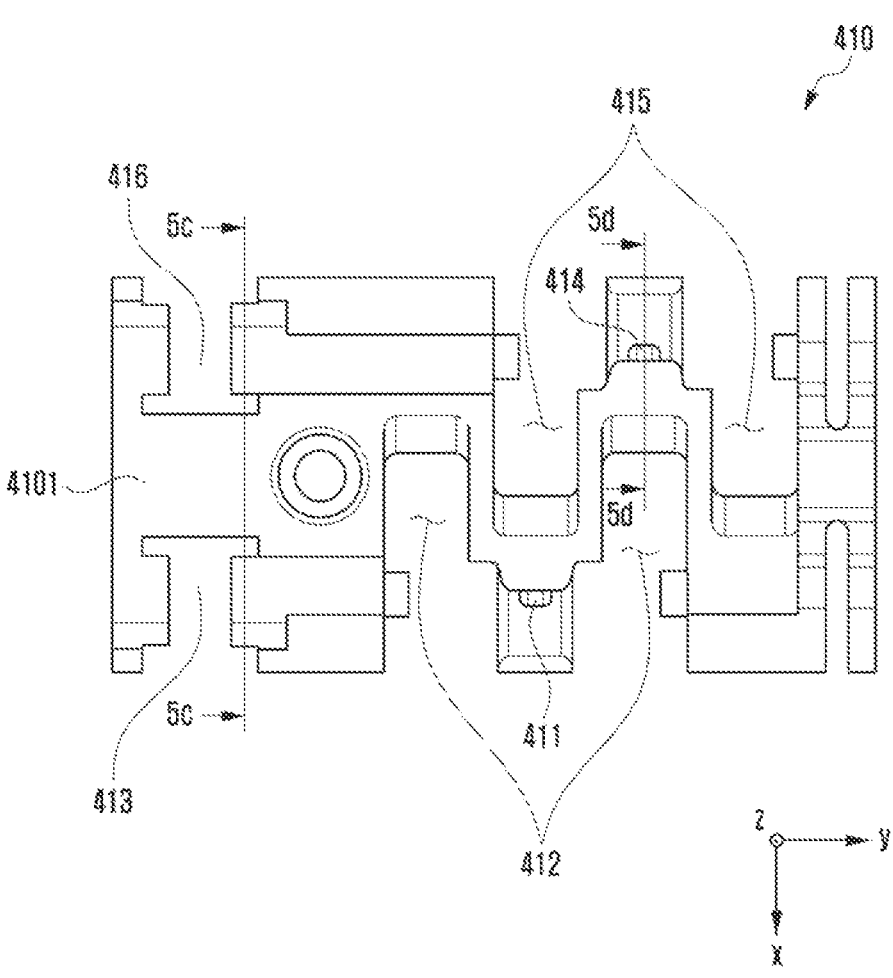
FIG. 5B is a plan view of a hinge bracket according to various embodiments of the disclosure.
Figure 5C:
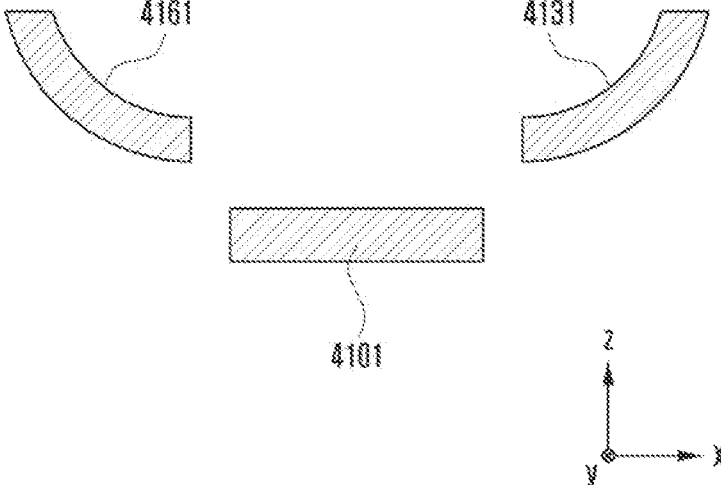
FIG. 5C is a sectional view of the hinge bracket viewed along line 5c-5c of FIG. according to various embodiments of the disclosure.
Figure 5D:
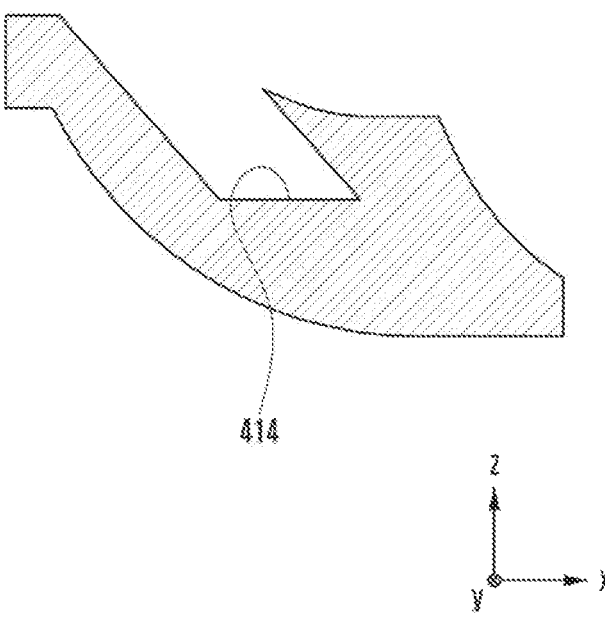
FIG. 5D is a sectional view of the hinge bracket viewed along line 5d-5d of FIG. according to various embodiments of the disclosure.

FIG. 5A is a perspective view of a hinge bracket according to various embodiments of the disclosure. FIG. 5B is a plan view of a hinge bracket according to various embodiments of the disclosure. FIG. 5C is a sectional view of the hinge bracket viewed along line 5c-5c of FIG. 5B, according to various embodiments of the disclosure. FIG. 5D is a sectional view of the hinge bracket viewed along line 5d-5d of FIG. 5B according to various embodiments of the disclosure.

Referring to FIGS. 5A to 5D, in the bracket body 4101, the hinge bracket 410 may include a first rail receiving part (e.g., the first rail receiving part 411 in FIG. 4A) disposed at one side of the folding axis (F) and configured to movably receive the first slide rail 421 and a second rail receiving part 414 disposed on the other side thereof and configured to movably receive the second slide rail 422. According to an embodiment, the hinge bracket 410 may include a first receiving parts 412 disposed at the left and right side of the first rail receiving part 411 and configured to receive at least a part of the first rotator (e.g., the first rotator 431 in FIG. 4A), and a second receiving parts 415 disposed at the left and right side of the second rail receiving part 414 and configured to receive at least a part of the second rotator (e.g., the second rotator 432 in FIG. 4A). According to an embodiment, in the bracket body 4101, the hinge bracket 410 may include a third receiving part 413 configured to rotatably receive the first support rotator (e.g., the first support rotator 441 in FIG. 4A) and a fourth receiving part 416 configured to rotatably receive the second support rotator (e.g., the second support rotator 442 in FIG. 4A).

According to various embodiments, in the bracket body 4101, the hinge bracket 410 may include a curved guide rib (e.g., the guide rib 4131 in FIG. 5C) disposed in the third receiving part 413 and a curved guide rib (e.g., the guide rib 4161 in FIG. 5C) disposed in the fourth receiving part 416. According to an embodiment, the second support rotator (e.g., the second support rotator 442 in FIG. 8) may be rotatably coupled to the hinge bracket 410 such that the guide rib 4161 is inserted into a guide rail (e.g., the guide rail 4421a in FIG. 8) disposed in the first rotation part (e.g., the first rotation part 4421 in FIG. 8) of the second support rotator 442 and then is guided. For example, the first support rotator (e.g., the first support rotator 441 in FIG. 4A) may also be rotatably coupled to the hinge bracket 410 in substantially the same manner.

Figure 6A:
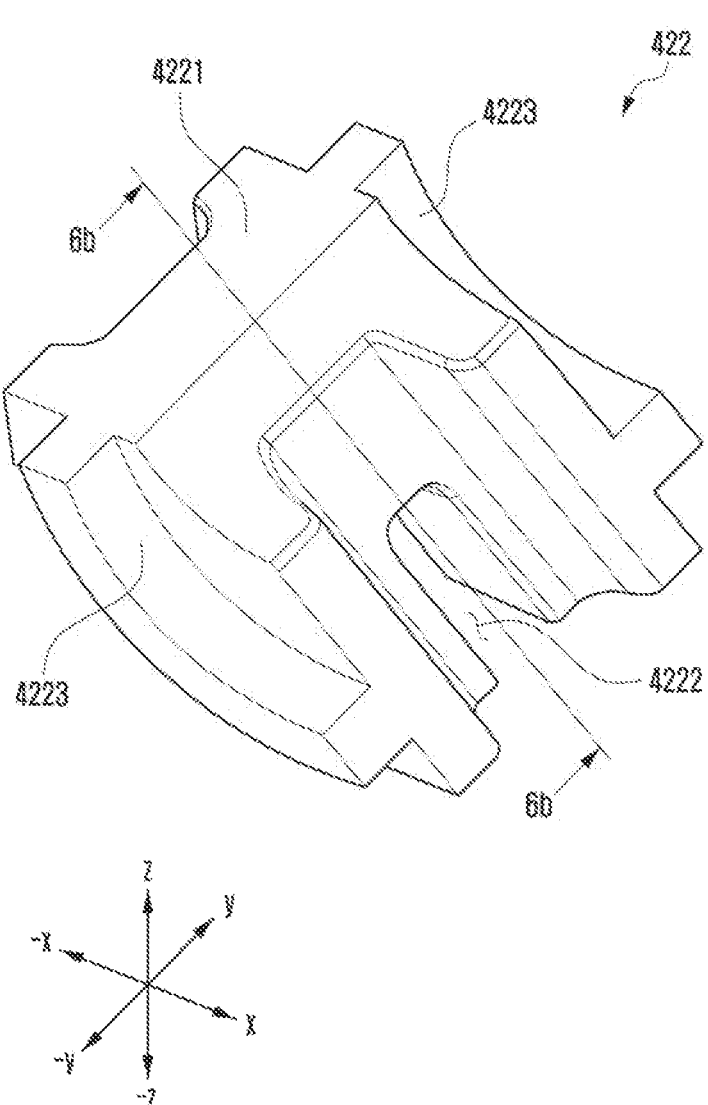
FIG. 6A is a perspective view of a slide rail according to various embodiments of the disclosure.
Figure 6B:
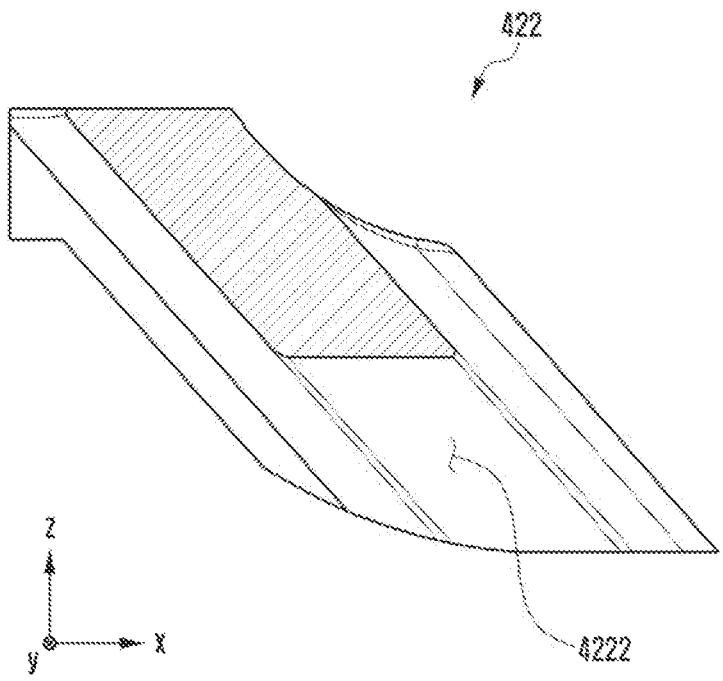
FIG. 6B is a sectional view of a slide rail viewed along line 6b-6b of FIG. 6A according to various embodiments of the disclosure.

FIG. 6A is a perspective view of a slide rail according to various embodiments of the disclosure. FIG. 6B is a sectional view of a slide rail viewed along line 6b-6b of FIG. 6A according to various embodiments of the disclosure.

Referring to FIGS. 6A and 6B, the second slide rail 422 may include a body 4221 and a guide groove 4222 formed from one side of the body 4221 to a designated length. According to an embodiment, the second slide rail 422 may include curved guide ribs 4223 disposed on both sides of the body 4221. According to an embodiment, the second slide rail 442 may be slidably coupled to the second rail receiving part (e.g., the second rail receiving part 414 in FIG. 5A) of the hinge bracket 410 by fitting the guide groove 4222 around the second receiving part, and the curved guide rib 4223 may also be inserted into a guide rail (e.g., the guide rail 4323 in FIG. 7A) disposed on a rotation part (e.g., the rotation part 4322 in FIG. 7A) of the second rotator (e.g., the second rotator 432 in FIG. 7A) and then be guided, thereby rotatably coupled thereto. For example, the second slide rail 422 may be coupled to the second rail receiving groove 414 of the hinge bracket 410 to be linearly reciprocatable with respect thereto, and the second rotator 432 may be rotatably coupled to the second slide rail 422. For example, the first slide rail (e.g., the first slide rail 421 in FIG. 4A) coupled to the hinge bracket 410 to be linearly reciprocatable and the first rotator (e.g., the first rotator 431 in FIG. 4A) rotatably coupled to the first slide rail 421 may also be coupled to each other in substantially the same manner.

Figure 7A:
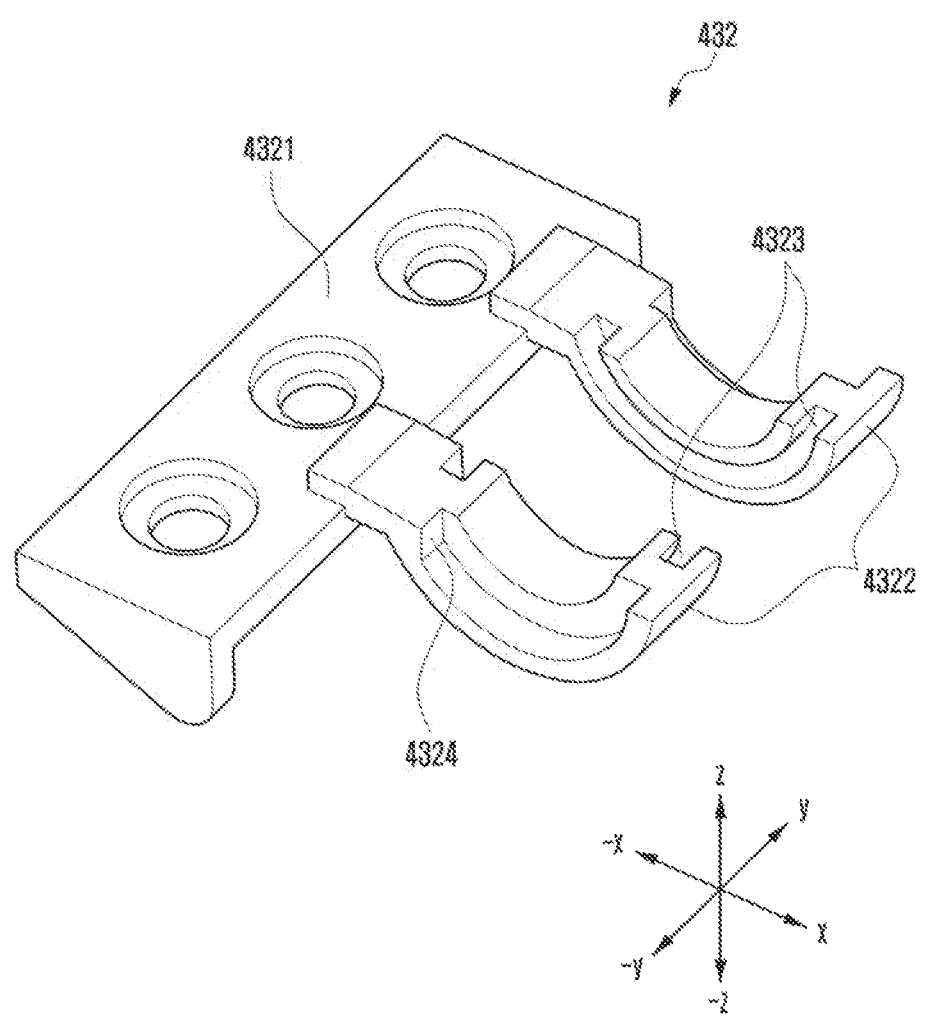
FIG. 7A is a perspective view of a rotator according to various embodiments of the disclosure.
Figure 7B:
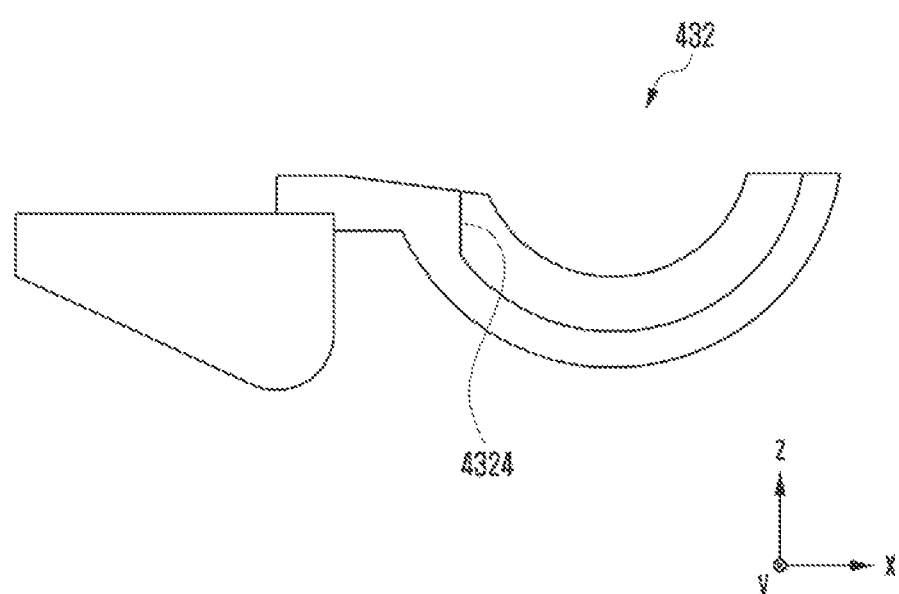
FIG. 7B is a side view of a rotator according to various embodiments of the disclosure.

FIG. 7A is a perspective view of a rotator according to various embodiments of the disclosure. FIG. 7B is a side view of a rotator according to various embodiments of the disclosure.

Referring to FIGS. 7A and 7B, the second rotator 432 may include a rotator body 4321 fixed to the second housing bracket (e.g., the second housing bracket 452 in FIG. 4A) and a pair of rotation parts 4322 extending from the rotator body 4321 and spaced apart at a designated interval. According to an embodiment, the pair of rotation parts 4322 may be formed in a curved shape corresponding to the shape of the second slide rail (e.g., the second slide rail 422 in FIG. 6A) and may include a curved guide rail 4323 configured to receive a guide rib (e.g., the guide rib 4223 in FIG. 6A) formed on the second slide rail 422. According to an embodiment, the rotation part 4322 may include a catching ledge 4324 disposed on one end thereof such that the catching ledge 4324 is caught on the hinge bracket (e.g., the hinge bracket 410 in FIG. 5A) when the second rotator 432 is rotated by a designated rotation amount, thereby limiting the rotation amount thereof. For example, this rotation amount may be substantially the same as the rotation amount for the second housing 220 to transition from the folded state to the unfolded state.

Figure 8:
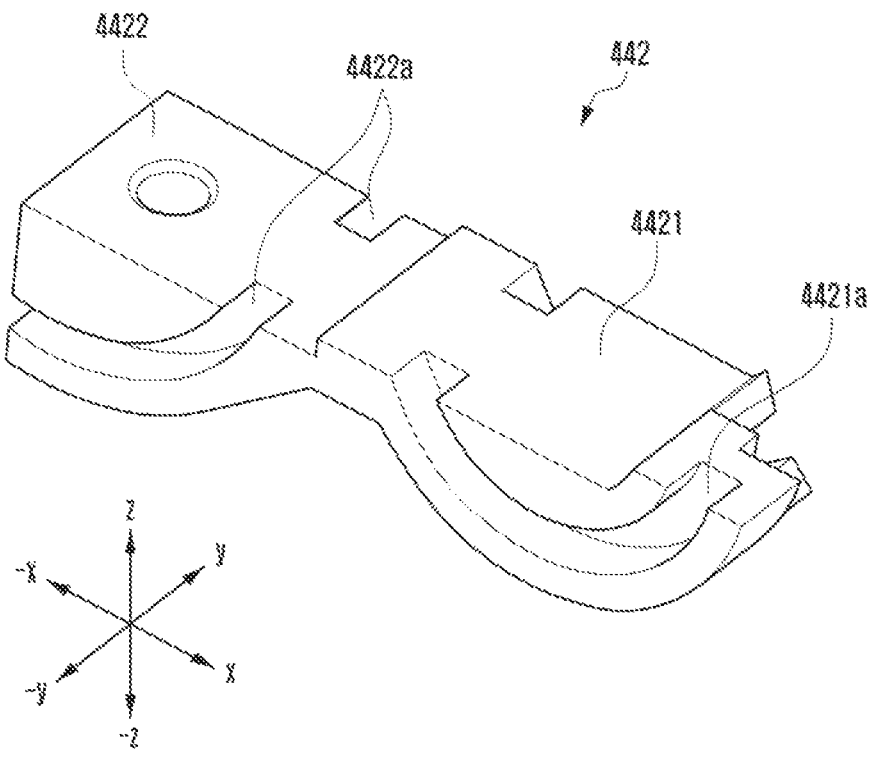
FIG. 8 is a perspective view of a support rotator according to various embodiments of the disclosure.

FIG. 8 is a perspective view of a support rotator according to various embodiments of the disclosure.

Referring to FIG. 8, the second support rotator 442 may include a first rotation part 4421 and a second rotation part 4422 integrally formed with the first rotation part 4421. According to an embodiment, the first rotation part 4421 may include a guide rail 4421a for receiving a guide rib (e.g., the guide rib 4161 in FIG. 5C) disposed in the fourth receiving part (e.g., the fourth receiving part 416 in FIG. 5A) of the hinge bracket (e.g., the hinge bracket 410 in FIG. 5A). According to an embodiment, the second rotation part 4422 may include a guide rail 4422a for receiving a guide rib (not numbered) disposed on a bracket rotation part (e.g., the bracket rotation part 4522 in FIG. 4A) of the second housing bracket (e.g., the second housing bracket 452 in FIG. 4A). Therefore, the second support rotator 442 may be rotatably coupled to the hinge bracket 410 through the first rotation part 4421, and may be rotatably coupled to the second housing bracket 452 through the second rotation part 4422. Through the rotatable coupling through these two rotation parts 4421 and 4422, the second hinge plate (e.g., the second hinge plate 312 in FIG. 3A) fixed to the second support rotator 442 may be folded more inward than the housing 220, thereby advantageously supporting the folding area (e.g., the folding area 230c in FIG. 1A) of the flexible display (e.g., the flexible display 230 in FIG. 3A) which is deformed into a waterdrop shape. According to an embodiment, the first support rotator (e.g., the first support rotator 441 in FIG. 4A) may be rotatably coupled to the hinge bracket 410 and the first housing bracket (e.g., the first housing bracket 451 in FIG. 4A) in substantially the same manner.

Figure 9A:
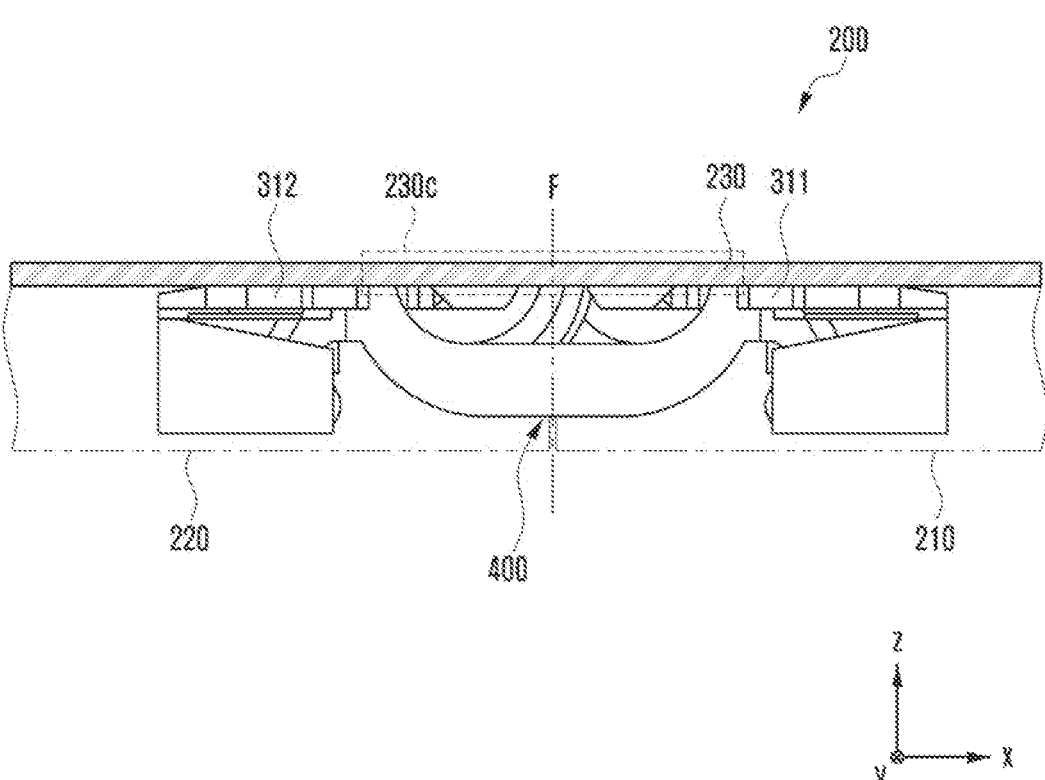
FIG. 9A is a schematic configuration diagram of an electronic device in an unfolded state according to various embodiments of the disclosure.
Figure 9B:
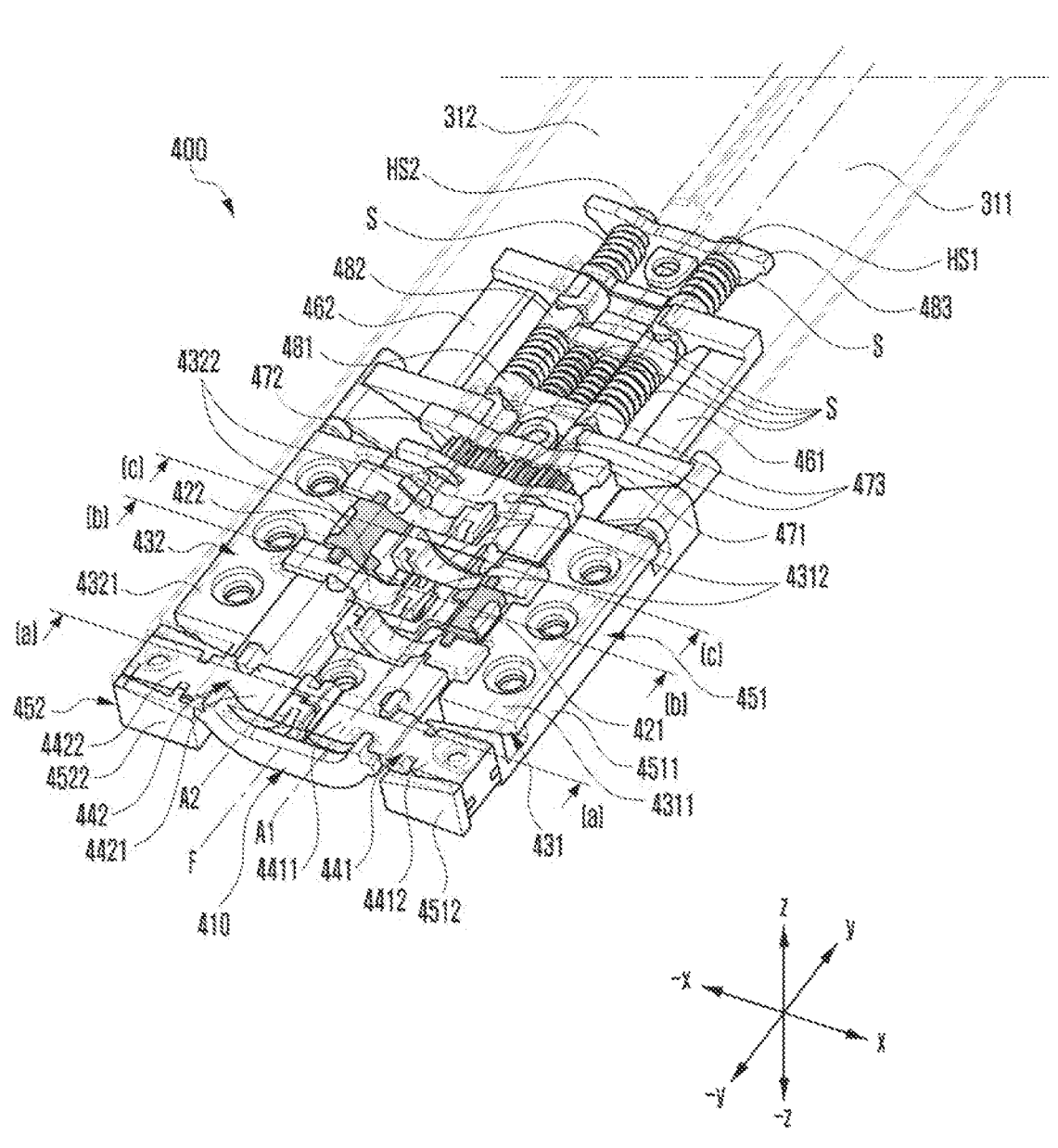
FIG. 9B is a configuration diagram of a hinge device in an unfolded state according to various embodiments of the disclosure.
Figure 9C:
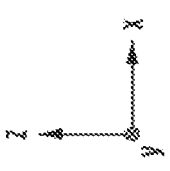
FIG. 9C shows a sectional view of the hinge device viewed along line (a)-(a), of FIG. 9B in an unfolded state according to various embodiments of the disclosure.
Figure 9C:
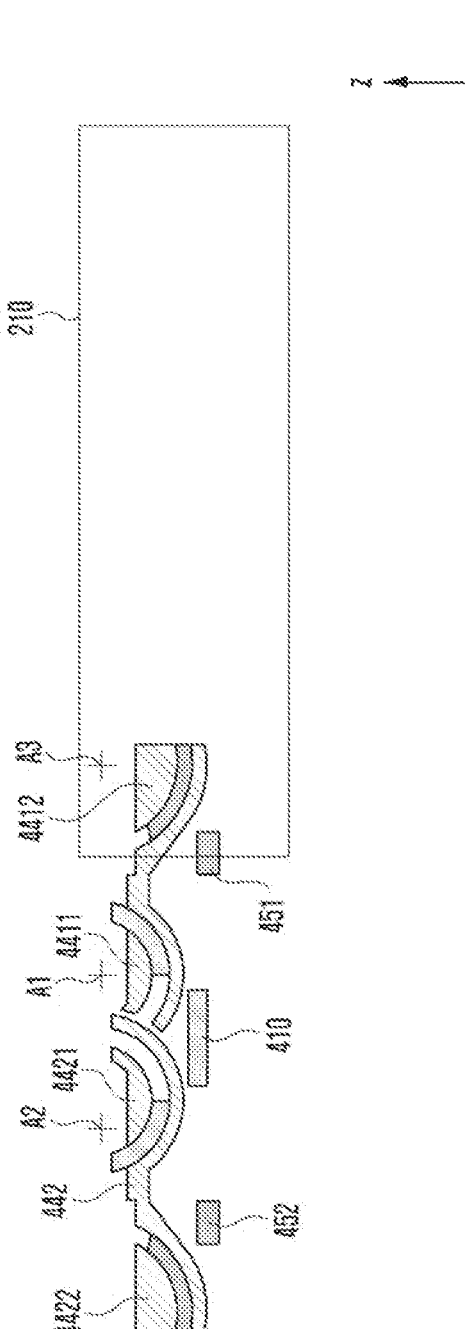
Figure 9D:
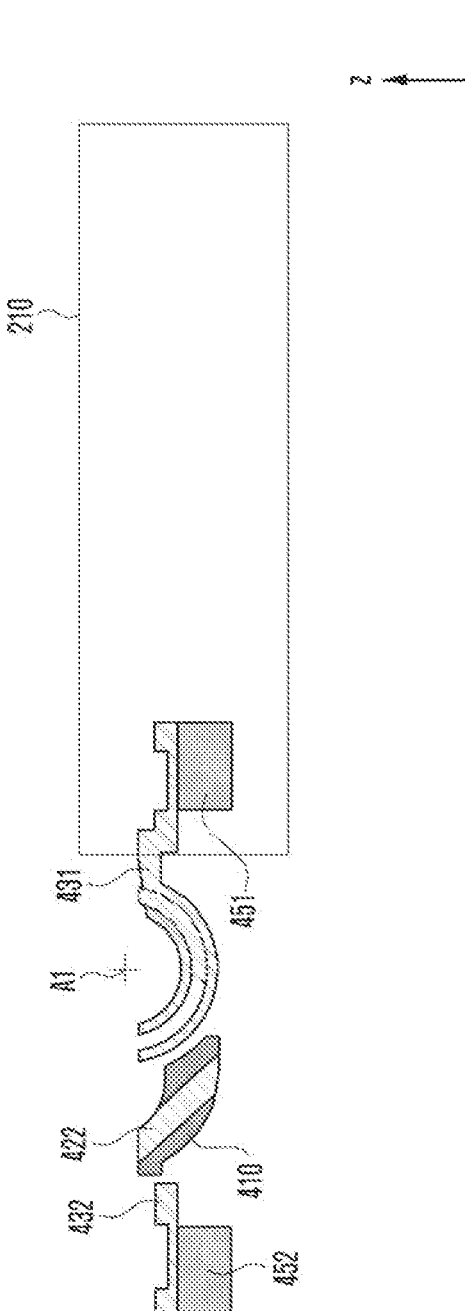
FIG. 9D shows a sectional view of the hinge device viewed along line (b)-(b), of FIG. 9B in an unfolded state according to various embodiments of the disclosure.
Figure 9D:
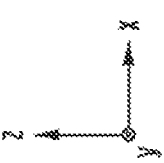
Figure 9E:
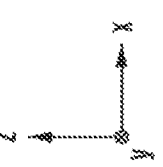
FIG. 9E shows a sectional view of the hinge device viewed along line (c)-(c), of FIG. 9B in an unfolded state according to various embodiments of the disclosure.
Figure 9E:
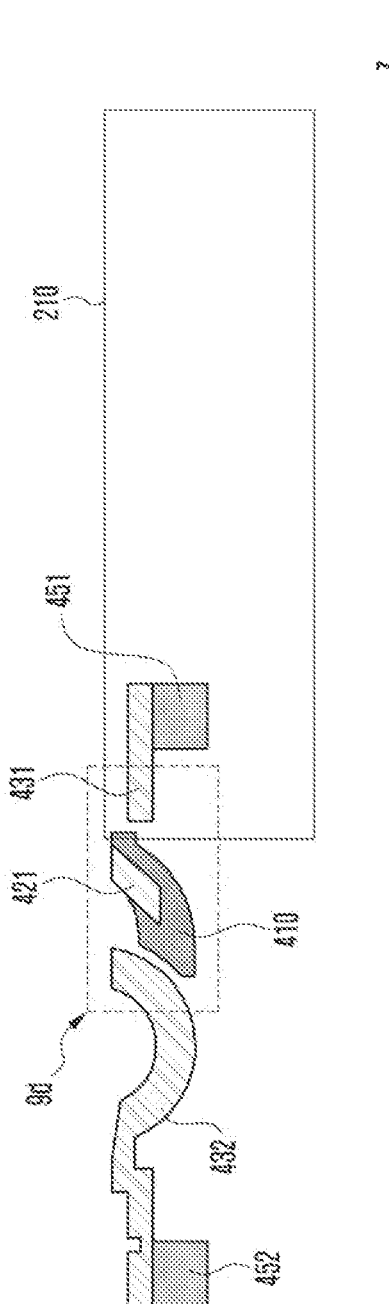
Figure 9F:
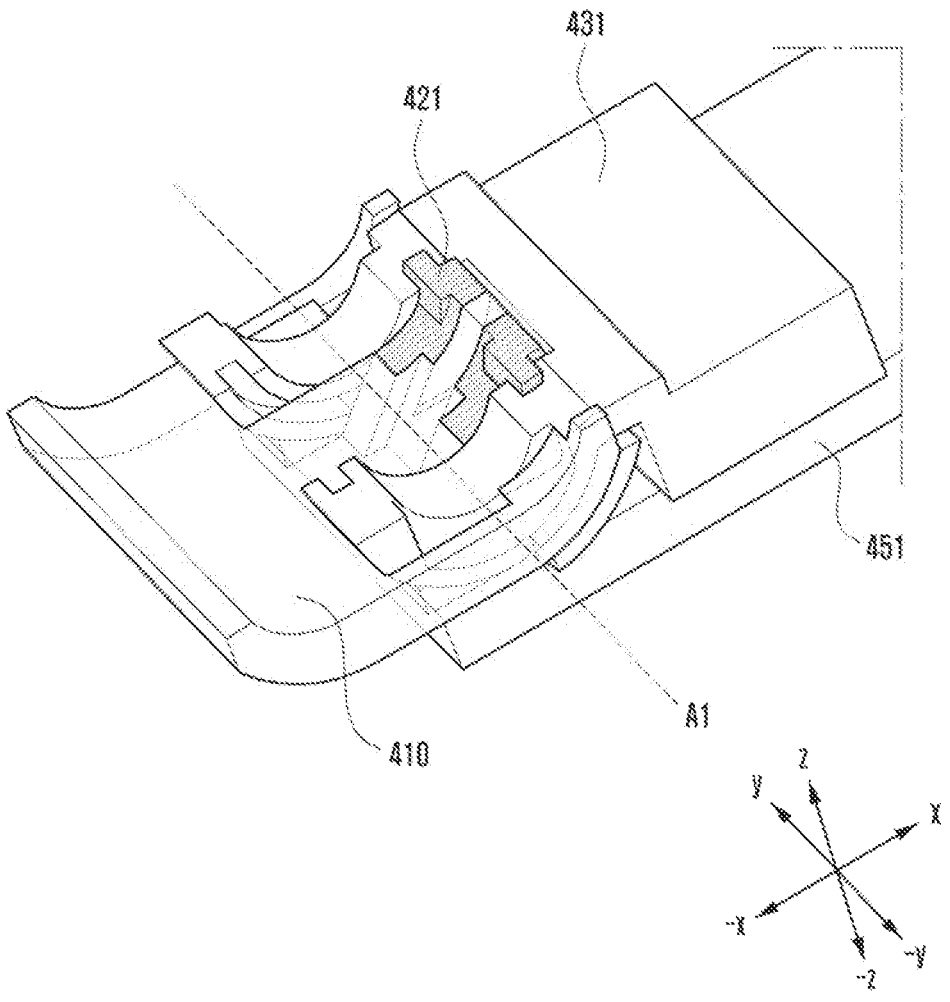
FIG. 9F is a view of area 9d of FIG. 9E, illustrating a state in which a rotator and a slide rail are coupled to each other in an unfolded state according to various embodiments of the disclosure.
Figure 9G:
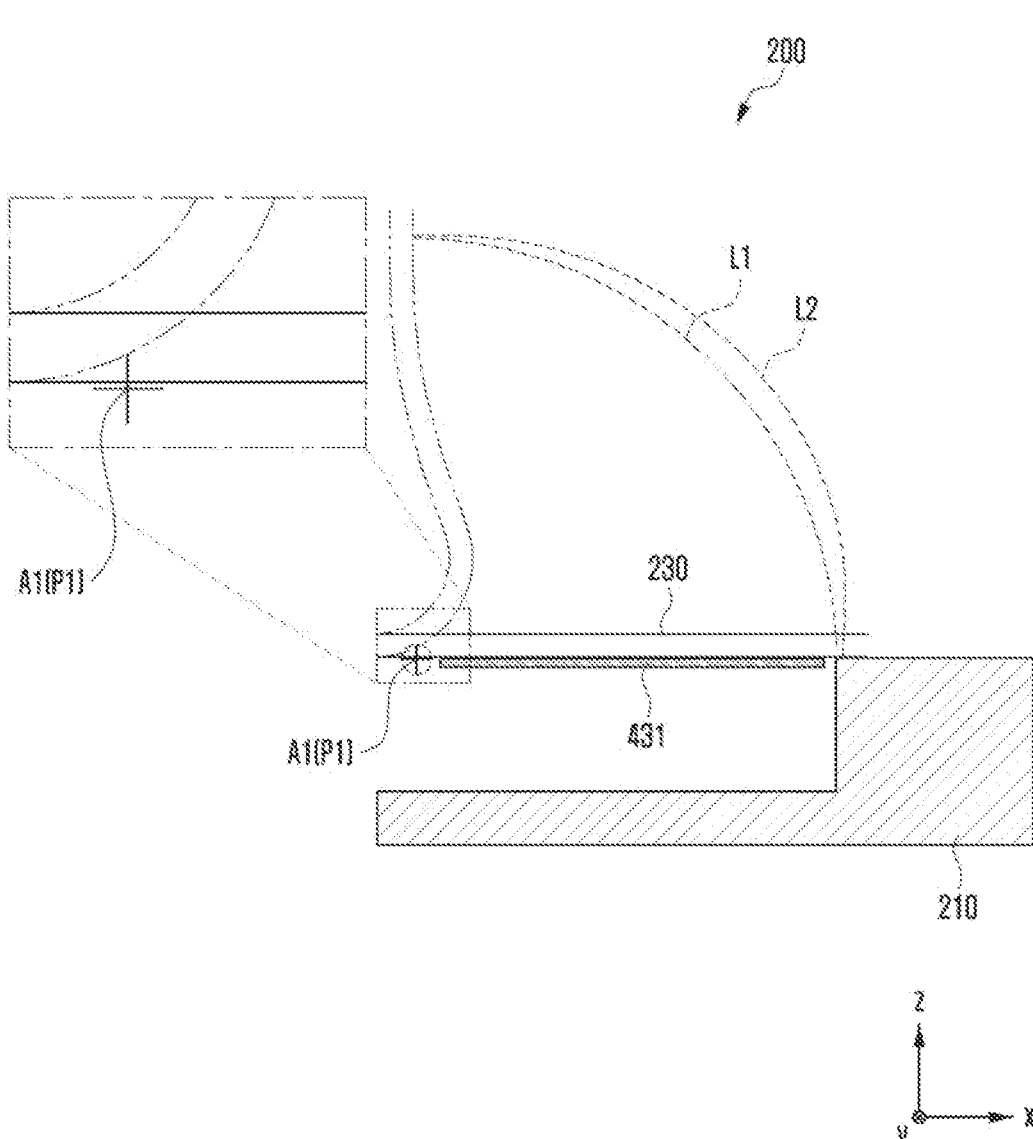
FIG. 9G illustrates a rotational axis of a rotator in an unfolded state according to various embodiments of the disclosure.

FIG. 9A is a schematic configuration diagram of an electronic device in an unfolded state according to various embodiments of the disclosure. FIG. 9B is a configuration diagram of a hinge device in an unfolded state according to various embodiments of the disclosure. FIGS. 9C-9E show sectional views of the hinge device viewed along lines (a)-(a), (b)-(b), and (c)-(c) of FIG. 9B, respectively, in an unfolded state according to various embodiments of the disclosure. FIG. 9F is a view of area 9d of FIG. 9E, illustrating a state in which a rotator and a slide rail are coupled to each other in an unfolded state according to various embodiments of the disclosure. FIG. 9G illustrates a rotational axis of a rotator in an unfolded state according to various embodiments of the disclosure.

Referring to FIGS. 9A to 9G, when the electronic device 200 is in an unfolded state, the first housing 210, the first hinge plate 311, the second hinge plate 312, and the second housing 220 may form the same plane, thereby supporting the rear surface of the flexible display 230. According to an embodiment, the first rotator 431 may be rotatably coupled to the first slide rail 421 slidably coupled to the hinge bracket 410, and the second rotator 432 may maintain in a state of being coupled to the second slide rail 422 linearly slidably coupled to the hinge bracket 410. According to an embodiment, the first slide rail 421 may be linearly slidably coupled to the hinge bracket 410. According to an embodiment, the first support plate 441 may maintain a state in which the first rotation part 4411 is rotatably coupled to the hinge bracket 410 and the second rotation part 4412 is rotatably coupled to the first housing bracket 451. According to an embodiment, the second support plate 442 may maintain a state in which the first rotation part 4421 is rotatably coupled to the hinge bracket 410 and the second rotation part 4422 is rotatably coupled to the second housing bracket 452. In this case, in the first housing 210, the first rotational axis (A1) of the first rotator 431 fixed through the first housing bracket 451 may be located at the first point (P1) near the rear surface of the flexible display 230. In the second housing 220, the second rotational axis (A2) of the second rotator 432 fixed through the second housing bracket 452 may also be located near the rear surface of the flexible display 230.

In FIG. 9G, Line (L1) represents a rotational trajectory formed by movement of one end of the first housing 210 with respect to the first rotational axis (A1), in consideration of only the folding/unfolding operation of the first housing 210, and Line (L2) represents a rotational trajectory formed by movement of one end of the first housing 210 to enable the folding area 230c of the flexible display 230 to be naturally folded into a waterdrop shape (e.g., to relieve the compressive force applied according to the folding operation of the flexible display). For example, the line (L1) and the line (L2) may become coincident in the fully unfolded state, during transition from the unfolded state to the folded state, a gap between the line (L1) and line (L2) may gradually increase until a designated intermediate folding angle (e.g., an inflection angle) is formed, and then when completely folded from the designated intermediate folding angle, the line (L1) and the line (L2) may become coincident again while the gap therebetween is gradually decreasing. For example, the designated folding angle may be about 45 degrees. However, without being limited thereto, the designated intermediate folding angle may be changed according to various shapes in which the folding area of the flexible display 230 is deformed in a folded state.

Figure 10A:
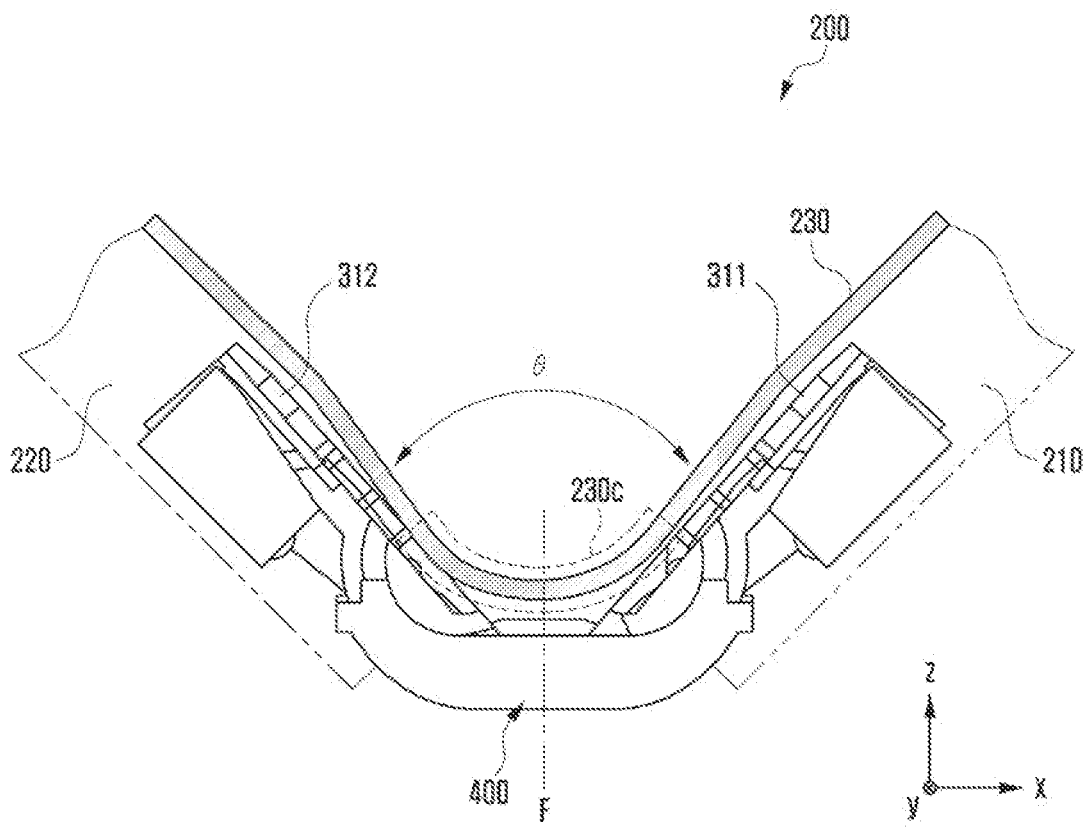
FIG. 10A is a schematic configuration diagram of an electronic device in an intermediate state according to various embodiments of the disclosure.
Figure 10B:
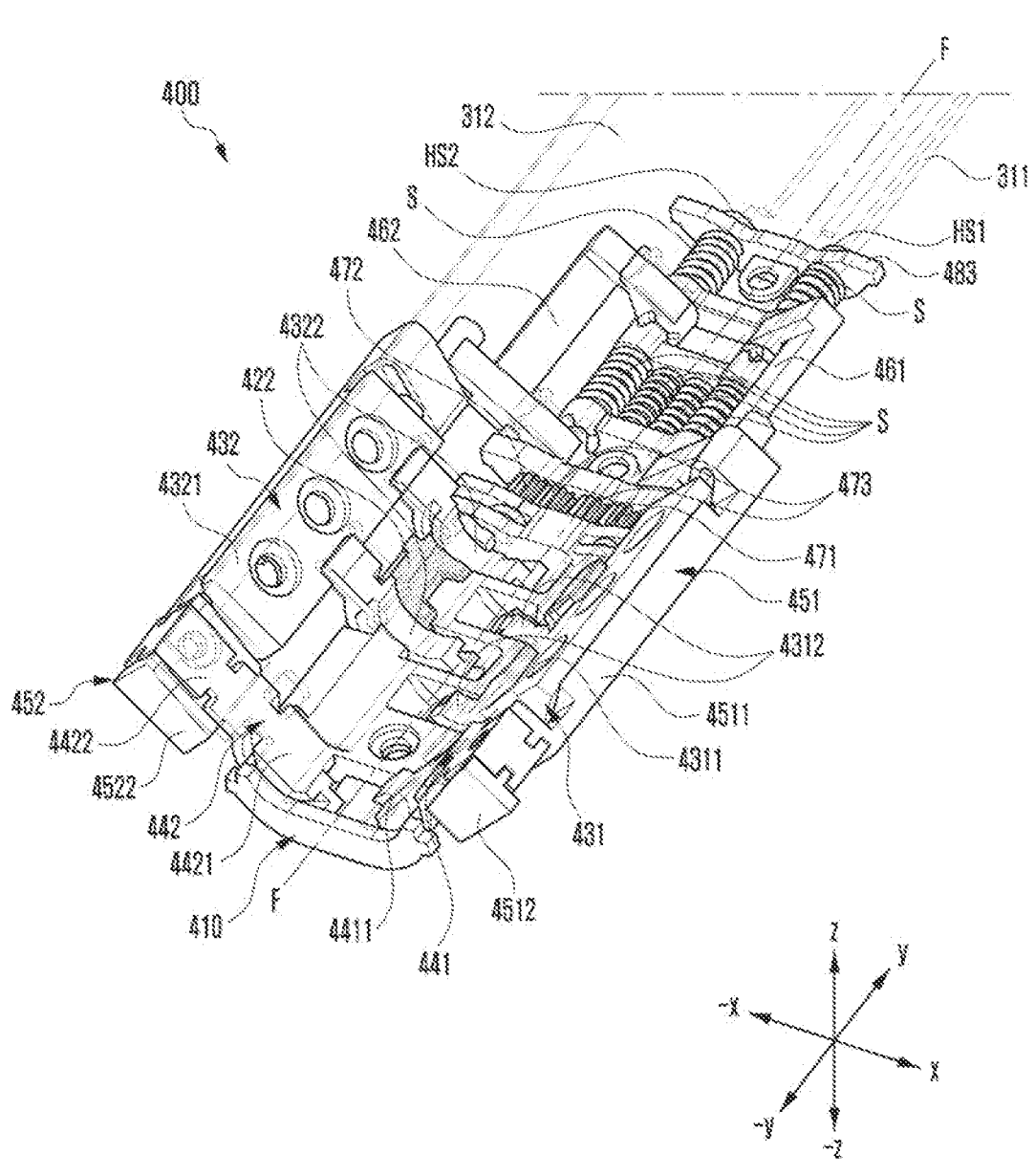
FIG. 10B is a configuration diagram of a hinge device in an intermediate state according to various embodiments of the disclosure.
Figure 10C:
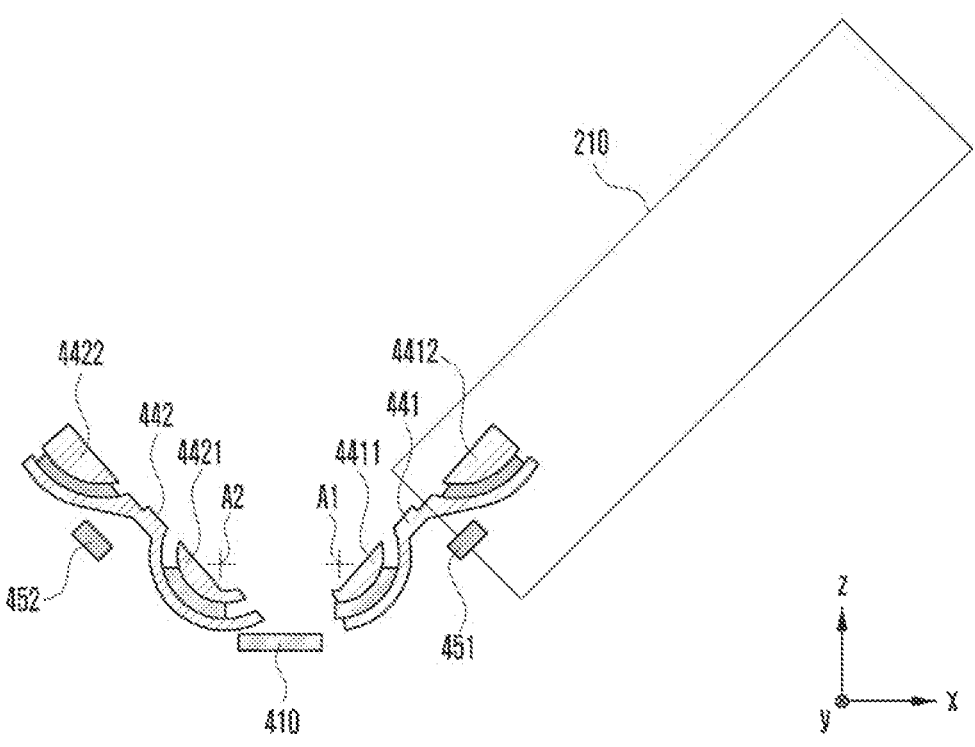
FIG. 10C shows a sectional view of the hinge device, viewed from a position corresponding to line (a)-(a) of FIG. 9B, in an intermediate state according to various embodiments of the disclosure.
Figure 10D:
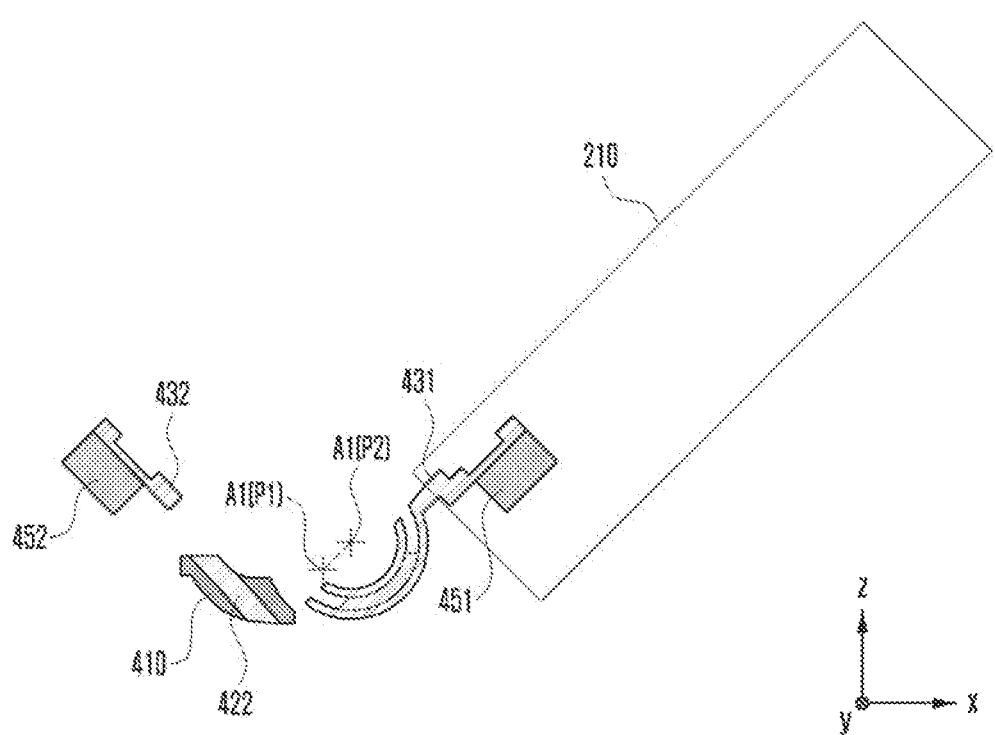
FIG. 10D shows a sectional view of the hinge device, viewed from a position corresponding to line (b)-(b) of FIG. 9B, in an intermediate state according to various embodiments of the disclosure.
Figure 10E:
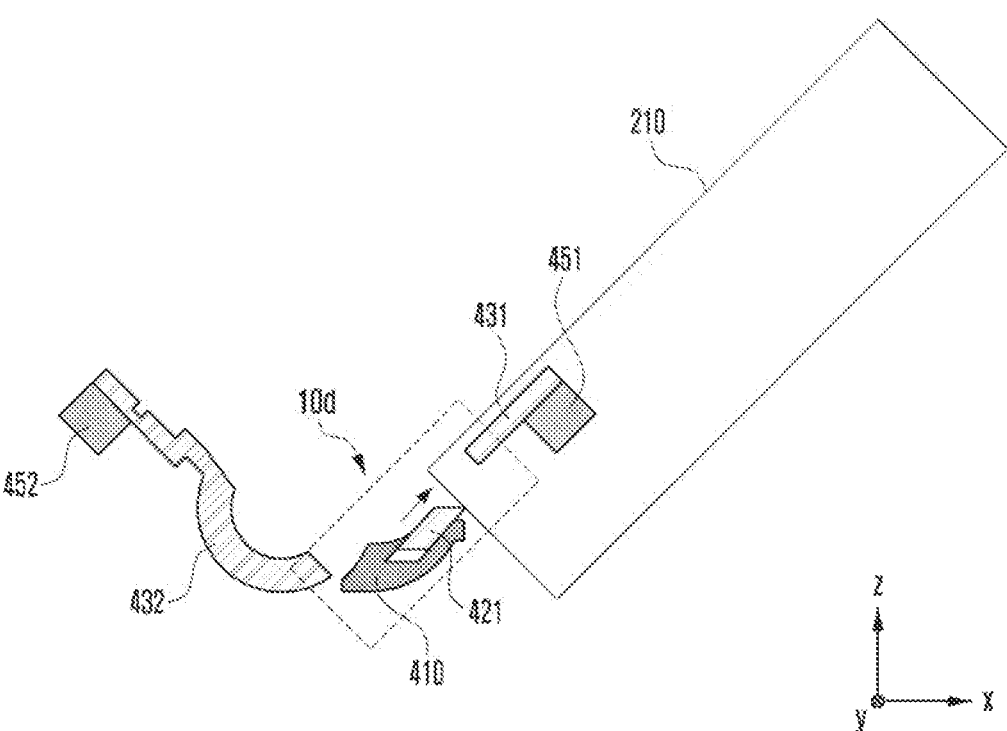
FIG. 10E shows a sectional view of the hinge device, viewed from a position corresponding to line (c)-(c) of FIG. 9B, in an intermediate state according to various embodiments of the disclosure.
Figure 10F:
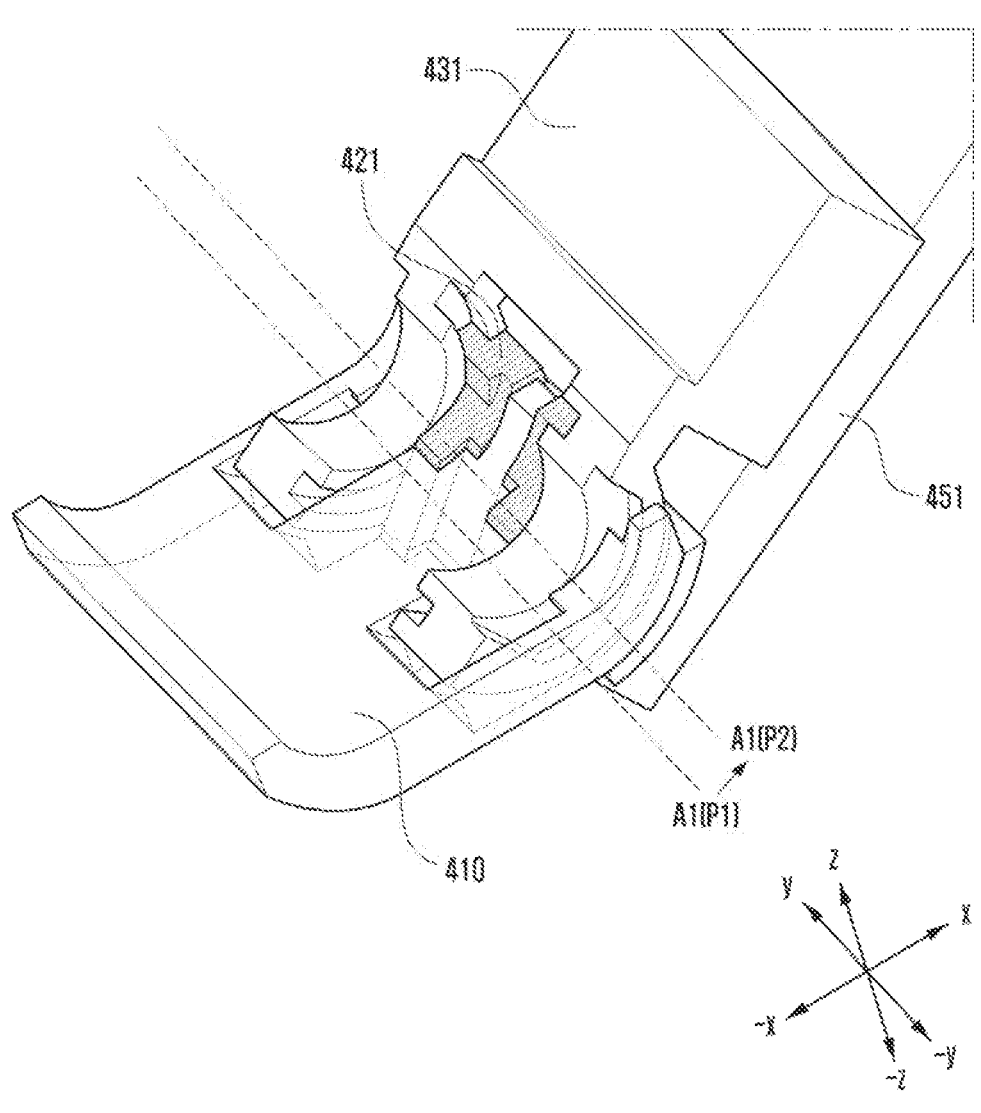
FIG. 10F is a view of area 10d of FIG. 10E, illustrating a state in which a rotator and a slide rail are coupled to each other in an intermediate state according to various embodiments of the disclosure.
Figure 10G:
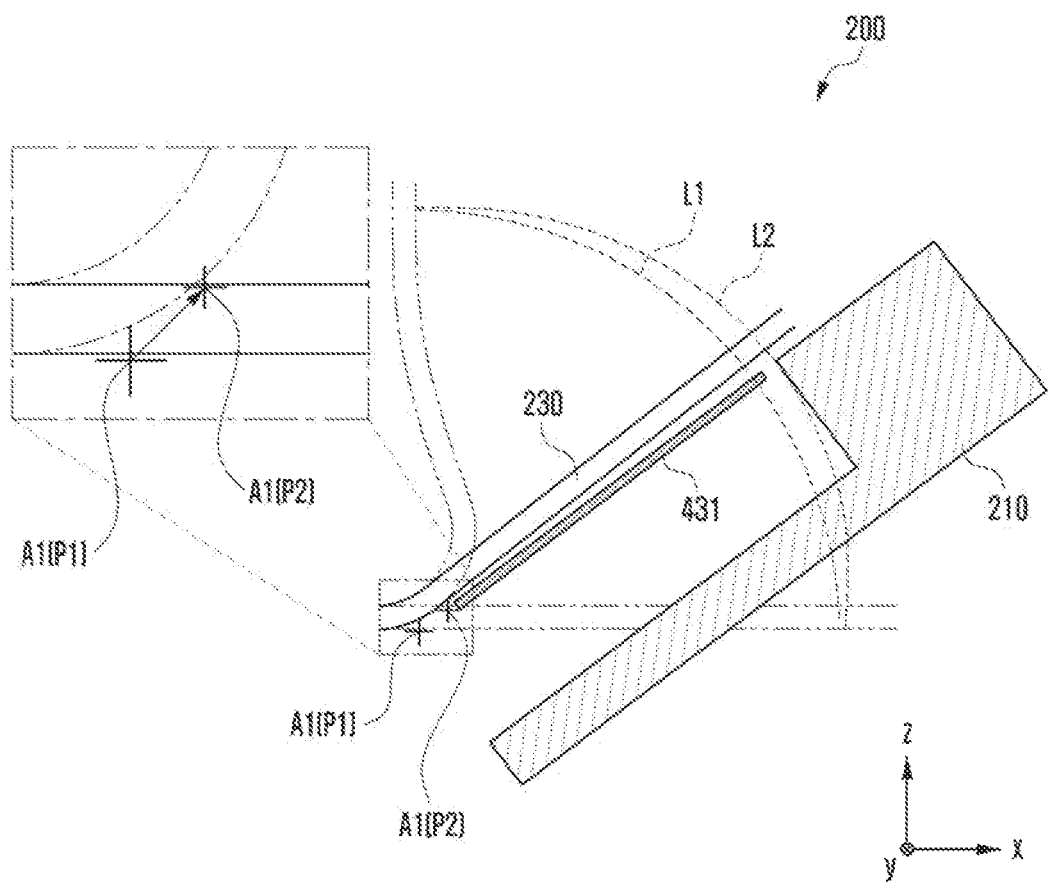
FIG. 10G illustrates movement of a rotational axis of a rotator in an intermediate state according to various embodiments of the disclosure.

FIG. 10A is a schematic configuration diagram of an electronic device in an intermediate state according to various embodiments of the disclosure. FIG. 10B is a configuration diagram of a hinge device in an intermediate state according to various embodiments of the disclosure. FIGS. 10C-10E show sectional views of the hinge device, viewed from positions corresponding to lines (a)-(a), (b)-(b), and (c)-(c) of FIG. 9B, respectively, in an intermediate state according to various embodiments of the disclosure. FIG. 10F is a view of area 10d of FIG. 10E, illustrating a state in which a rotator and a slide rail are coupled to each other in an intermediate state according to various embodiments of the disclosure. FIG. 10G illustrates movement of a rotational axis of a rotator in an intermediate state according to various embodiments of the disclosure.

Referring to FIGS. 10A to 10G, the electronic device 200 may move in a direction in which the first housing 210 is folded, and may transition to an intermediate state having a designated intermediate folding angle (θ). In this case, according to the folding operation of the first housing 210, the first rotator 431 may also rotate about the first rotational axis (A1) along the first slide rail 421 rotatably coupled to the hinge bracket 410. According to an embodiment, the folding area 230c of the flexible display 230 may be subjected to compressive force while being folded into a waterdrop shape, and as a result, the first slide rail 421 may be linearly moved from the hinge bracket by a designated length. For example, the first rotator 431 may rotate along the first slide rail 421, and at the same time, the first slide rail 421 may linearly move along the first rail receiving part 411 of the hinge bracket 410. Through the combined operation of the first rotator 431 and the first slide rail 421, the first rotational axis (A1) may be moved from the first point (P1) to the second point (P2), so that the compressive force generated by the folding of the folding area of the flexible display 230 may be relieved. For example, the second point (P2) of the first rotational axis (A1) may overlap the flexible display 230 or may be higher than the upper surface of the flexible display 230. According to an embodiment, the second rotational axis (A2) of the second rotator 432 may also be moved to another designated point through substantially the same operation. According to an embodiment, when the designated intermediate folding angle (θ) of the flexible display 230 is 45 degrees, the distance between the line (L1) and the line (L2) according to the rotational trajectory of the first housing 210 may be maximum. In some embodiments, the intermediate folding angle (θ) may be determined according to a bent shape of the folding area 230c of the flexible display 230.

Figure 11A:
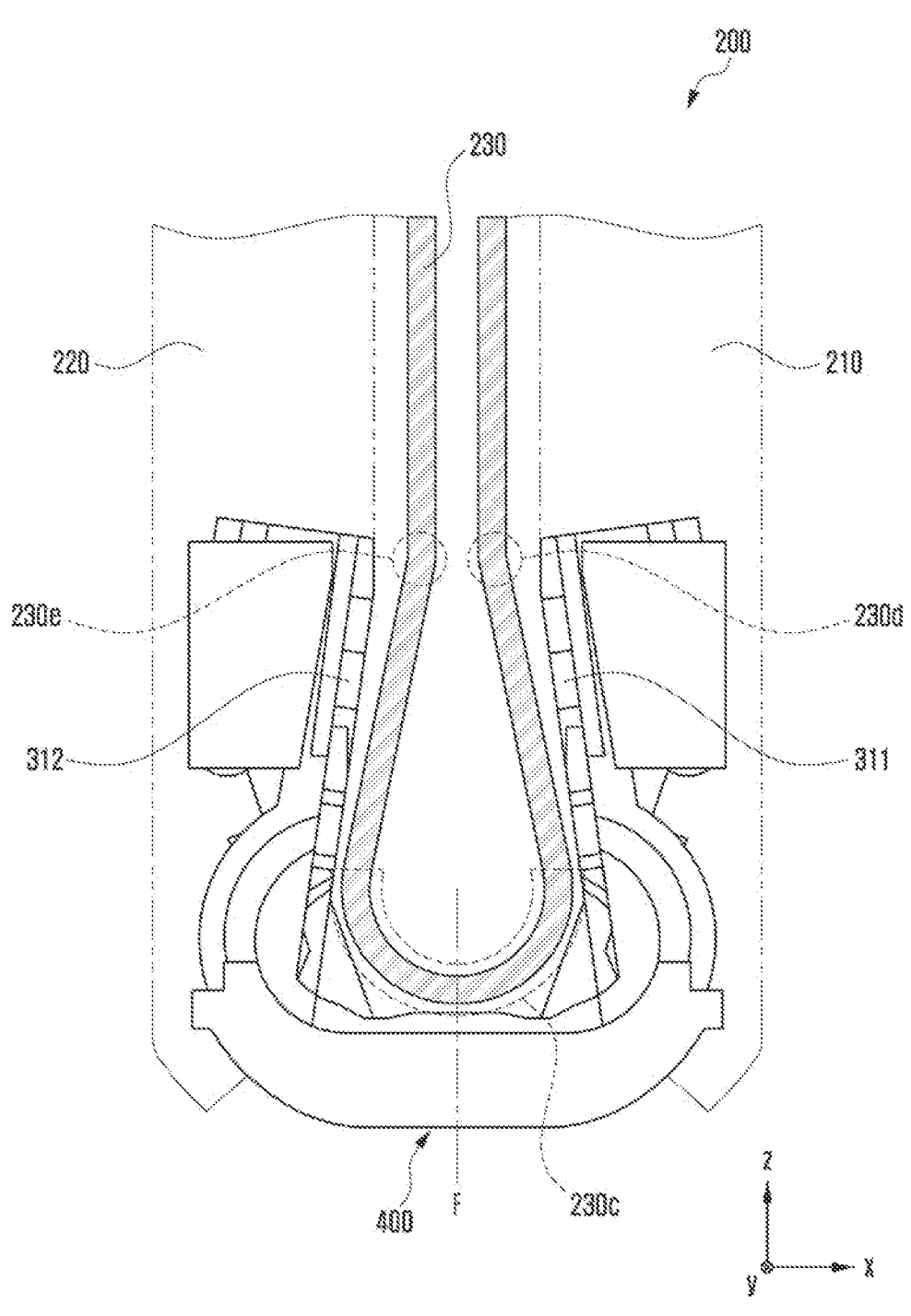
FIG. 11A is a schematic configuration diagram of an electronic device in a folded state according to various embodiments of the disclosure.
Figure 11B:
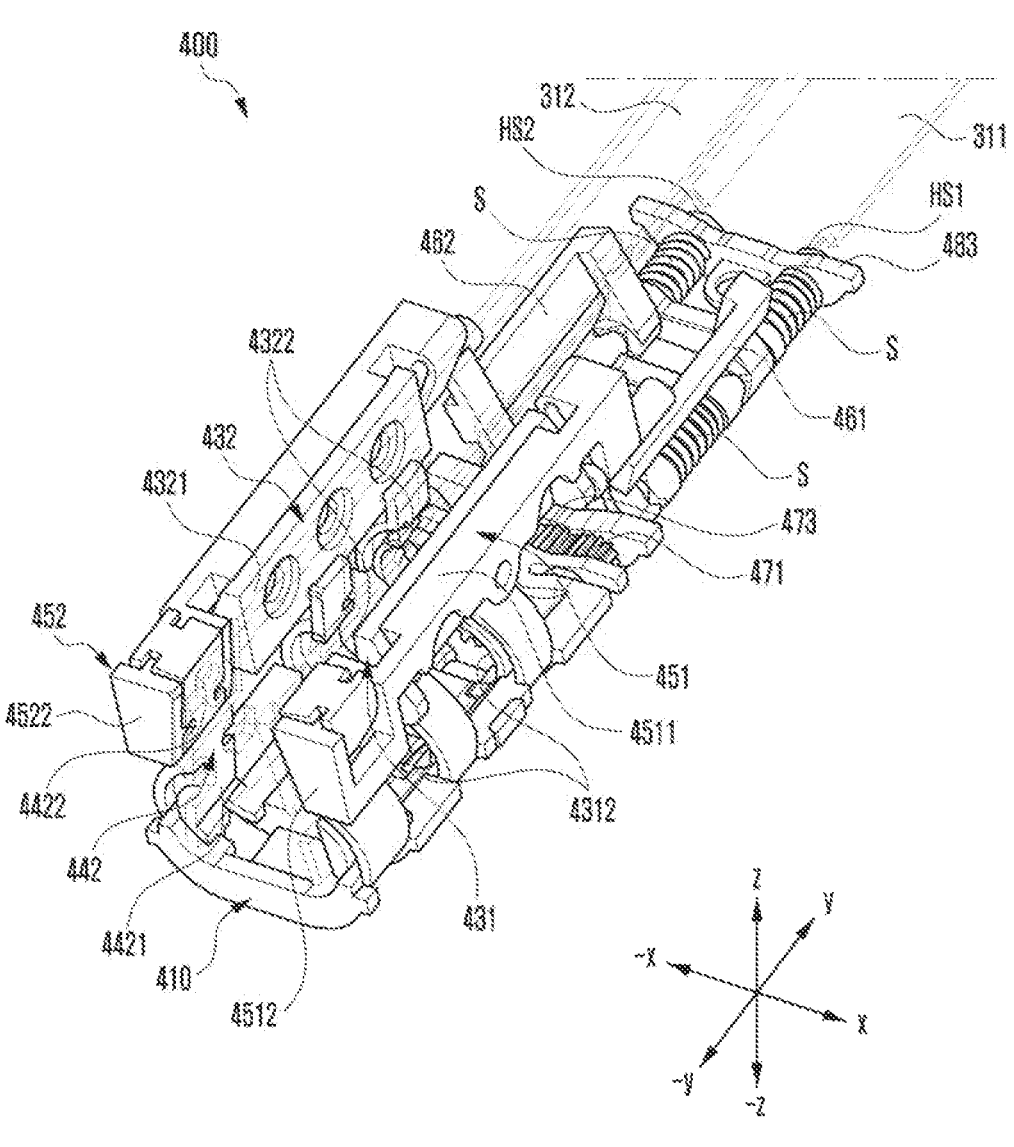
FIG. 11B is a configuration diagram of a hinge device in a folded state according to various embodiments of the disclosure.
Figure 11C:
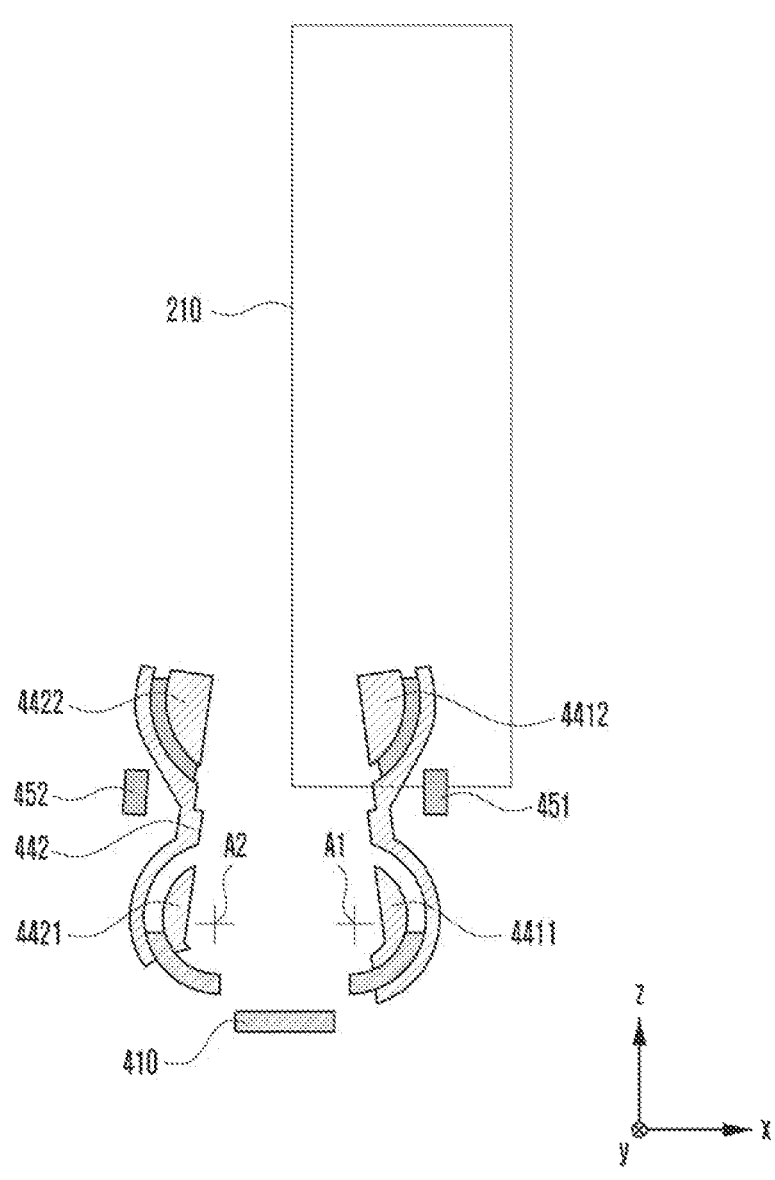
FIG. 11C shows a sectional view of the hinge device, viewed from positions corresponding to line (a)-(a) of FIG. 9B in a folded state according to various embodiments of the disclosure.
Figure 11D:
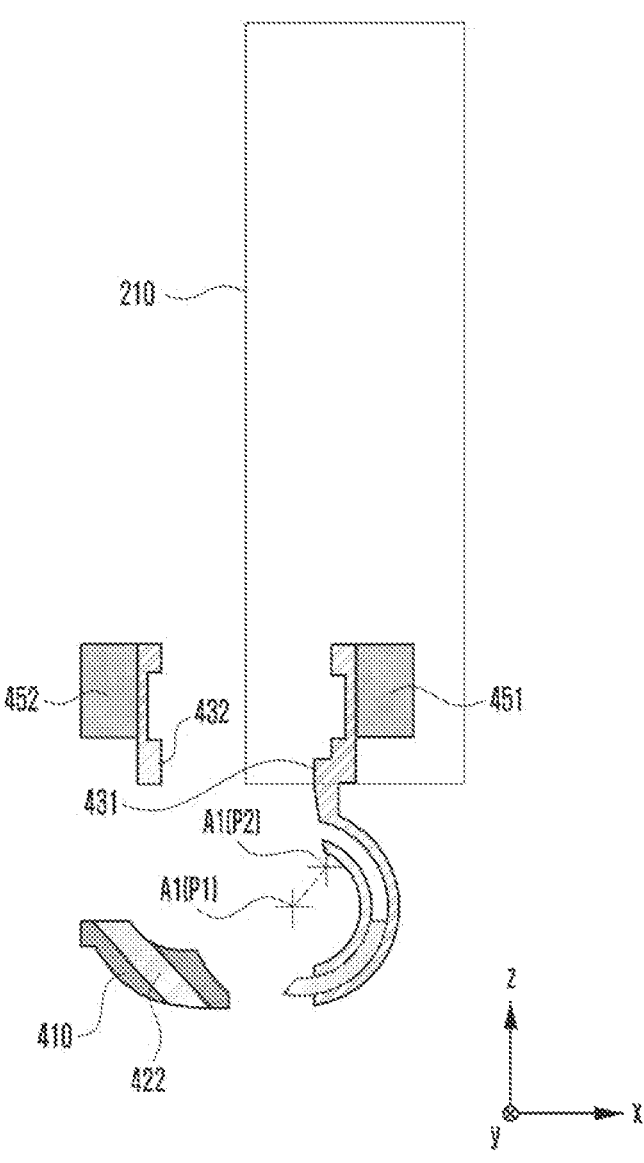
FIG. 11D shows a sectional view of the hinge device, viewed from positions corresponding to line (b)-(b) of FIG. 9B in a folded state according to various embodiments of the disclosure.
Figure 11E:
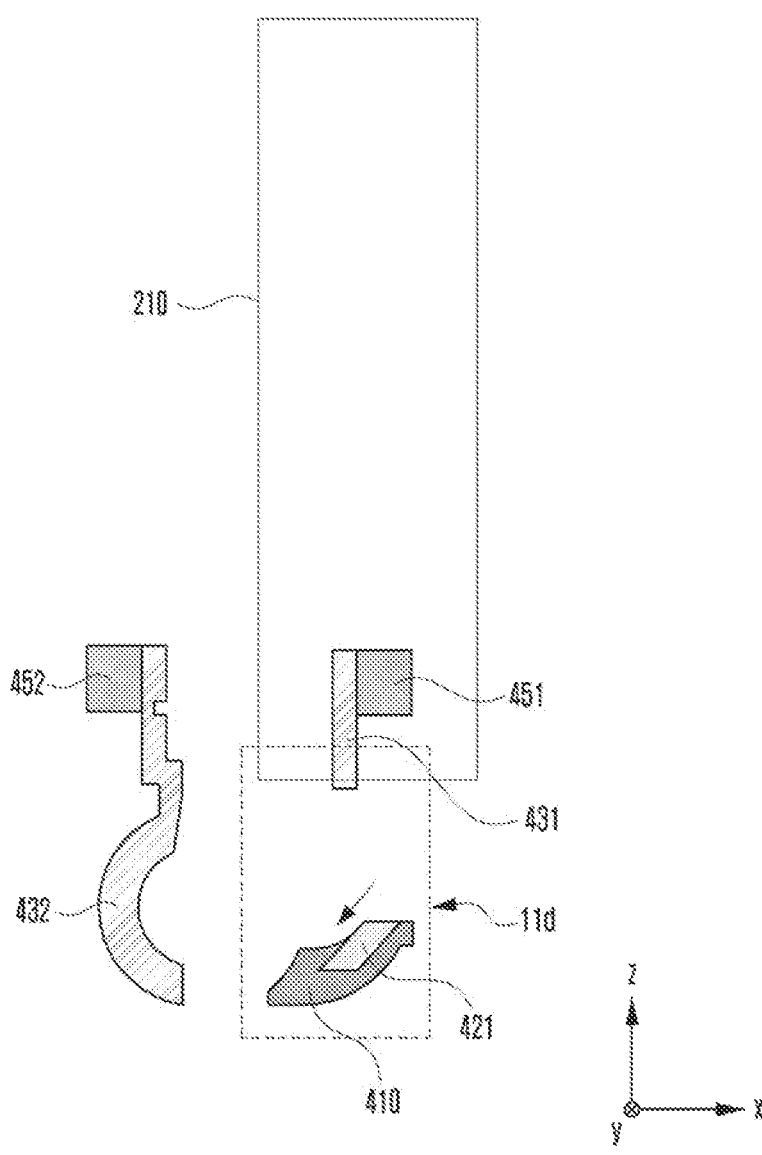
FIG. 11E shows a sectional view of the hinge device, viewed from positions corresponding to line (c)-(c) of FIG. 9B in a folded state according to various embodiments of the disclosure.
Figure 11F:
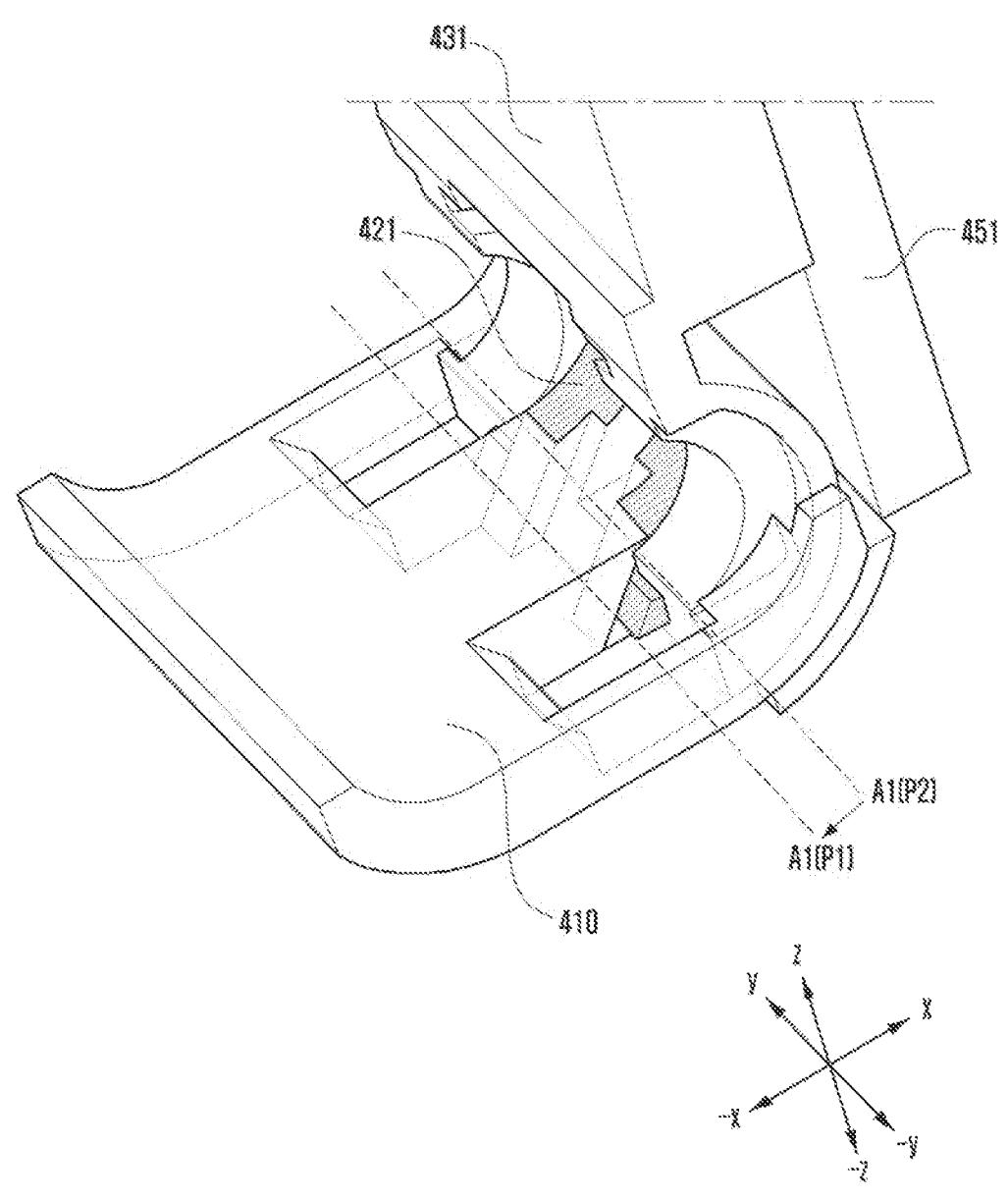
FIG. 11F illustrates a state in which a rotator and a slide rail in area 11d of FIG. 11E in a folded state according to various embodiments of the disclosure.
Figure 11G:
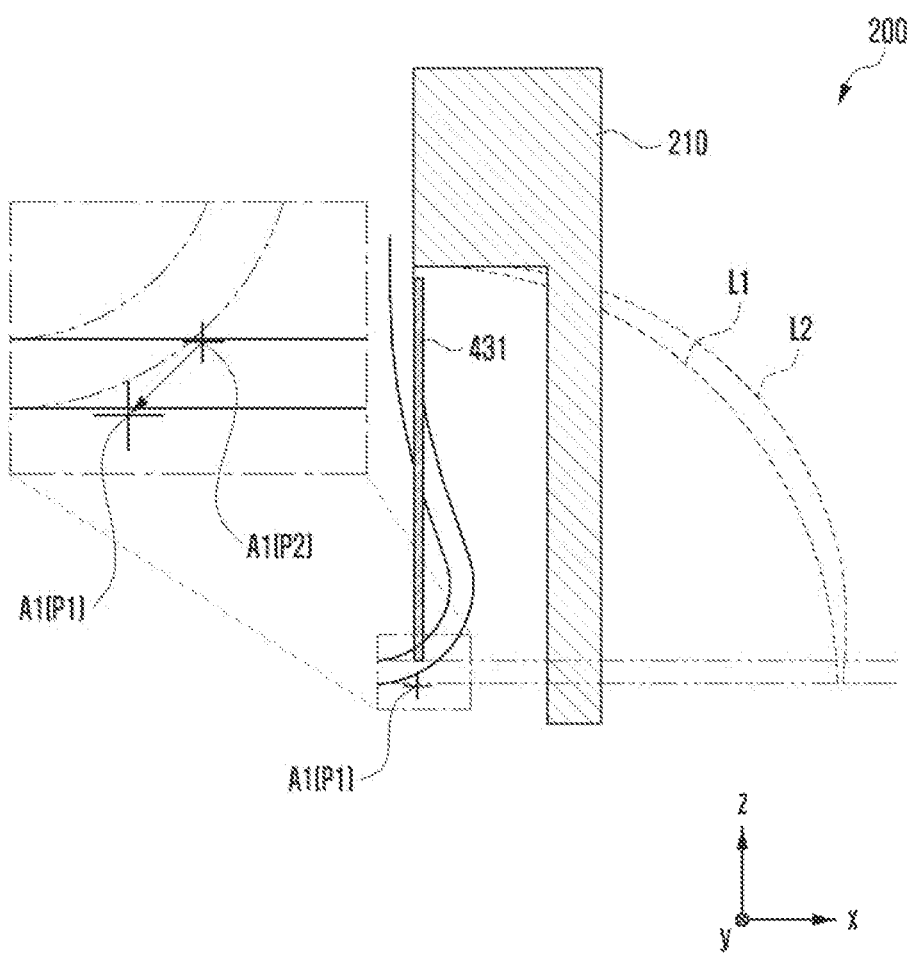
FIG. 11G illustrates movement of a rotational axis of a rotator in a folded state according to various embodiments of the disclosure.

FIG. 11A is a schematic configuration diagram of an electronic device in a folded state according to various embodiments of the disclosure. FIG. 11B is a configuration diagram of a hinge device in a folded state according to various embodiments of the disclosure. FIGS. 11C-11G show sectional views of the hinge device, viewed from positions corresponding to lines (a)-(a), (b)-(b), and (c)-(c) of FIG. 9B, respectively, in a folded state according to various embodiments of the disclosure. FIG. 11F illustrates a state in which a rotator and a slide rail in area 11d of FIG. 11E in a folded state according to various embodiments of the disclosure. FIG. 11G illustrates movement of a rotational axis of a rotator in a folded state according to various embodiments of the disclosure.

Referring to FIGS. 11A to 11G, when the flexible display 230 transitions from a designated folding angle (θ) to a completely folded state, the first rotator 431 may rotate about the first rotational axis (A1) along the first slide rail 421 rotatably coupled to the hinge bracket 410 according to the folding of the first housing 210. In this case, the compressive force applied to the folding area of the flexible display 230 may gradually decrease, and the first slide rail 421 may return to the original position thereof along the first rail receiving part 411 of the hinge bracket 410. For example, the first rotator 431 may continuously rotate along the first slide rail 421, and at the same time, the first slide rail 421 may linearly move along the first rail receiving part 411 of the hinge bracket 410 to return to the original position thereof. Through the combined operation of the first rotator 431 and the first slide rail 421, the first rotating shaft (A1) may be moved from the second point (P2) to the first point (P1). According to an embodiment, in the folding state, the flexible display 230 may include a waterdrop shape formed through a folding area 230c and reverse bending areas 230d and 230e bent in the opposite direction to the folding area 230c, the folding area 230c being supported through the first and second hinge plates 311 and 312, and the reverse bending areas 230d and 230e being at positions corresponding to the boundary areas between the first and second hinge plates 311 and 312 and the first and second housings 210 and 220, respectively.

According to various embodiments, when the flexible display 230 transitions from a folded state to an unfolded state, compressive force to the flexible display 230 may repeatedly increase and decrease based on the designated intermediate folding angle (θ) (e.g., about 45 degrees), and the compression force may be relieved by the movement of the first slide rail 421 and the second slide rail 422. Accordingly, buckling of the flexible display 230 that may occur during operation may be advantageously reduced.

According to various embodiments, an electronic device (e.g., the electronic device 200 in FIG. 1A) may include a first housing (e.g., the first housing 210 in FIG. 1A), a second housing (e.g., the second housing 220 in FIG. 1A), a hinge device (e.g., the hinge device 400 in FIG. 4A) configured to connect the first housing and the second housing to be foldable with respect to a folding axis (e.g., the folding axis (F) in FIG. 1A), and a flexible display (e.g., the flexible display 230 in FIG. 1A) disposed to be supported by the first housing and the second housing, wherein the hinge device includes a hinge bracket (e.g., the hinge bracket 410 in FIG. 4A), a first slide rail (e.g., the first slide 421 in FIG. 4A) movably disposed at the hinge bracket and at one side of the folding axis, a second slide rail (e.g., the second slide rail 422 in FIG. 4A) movably disposed at the hinge bracket and at the other side of the folding axis, a first rotator (e.g., the first rotator 431 in FIG. 4A) rotatably disposed on the first slide rail, and a second rotator (e.g., the second rotator 432 in FIG. 4A) rotatably disposed on the second slide rail, wherein when the electronic device transitions from a folded state to an unfolded state or from an unfolded state to a folded state, the first slide rail and the second slide rail are moved with respect to the hinge bracket by a designated linear distance.

According to various embodiments, the first rotator may be connected to the first housing and be configured to rotate around a first rotational axis relative by the first slide rail, the second rotator may be connected to the second housing and be configured to rotate around a second rotational axis by the second slide rail, and when the electronic device transitions from a folded state to an unfolded state or from the unfolded state to the folded state, the first rotational axis may be moved by movement of the first slide rail, and the second rotational axis may be moved by movement of the second slide rail.

According to various embodiments, the first rotational axis may be located at the same point in the folded state and the unfolded state, and the second rotational axis may be located at the same point in the folded state and the unfolded state.

According to various embodiments, the first slide rail and the second slide rail may have a maximum linear movement distance at a designated intermediate folding angle.

According to various embodiments, the designated intermediate folding angle may include 45 degrees.

According to various embodiments, the intermediate folding angle may be determined according to a deformed shape of the folding area in the folded state.

According to various embodiments, the first slide rail and/or the second slide rail may include a guide groove having a designated length and coupled to a rail receiving part disposed in the hinge bracket, such that the first slide rail and/or the second slide rail are linearly movable.

According to various embodiments, the first rotator and/or the second rotator may include a curved rotation part, the first slide rail and/or the second slide rail may include a curved guide rib disposed on an outer surface thereof, and the first rotator and/or the second rotator may be rotatably coupled by insertion of the guide rib into the guide rail.

According to various embodiments, the electronic device may include a first support rotator having one end rotatably coupled to the hinge bracket and the other end rotatably coupled to the first rotator, and a second support rotator having one end rotatably coupled to the hinge bracket and the other end rotatably coupled to the second rotator.

According to various embodiments, the electronic device may include a first hinge plate coupled to the first support rotator and a second hinge plate coupled to the second support rotator, wherein in the unfolded state, the first housing, the first hinge plate, the second housing, and the second hinge plate form the same plane.

According to various embodiments, in the folded state, the first housing and the first hinge plate may form different planes, and the second housing and the second hinge plate may form different planes.

According to various embodiments, the electronic device may include a first housing bracket configured to fix the first rotator and the second housing, and a second housing bracket configured to fix the second rotator and the second housing, wherein the first support rotator is rotatably fixed to the first housing bracket, and the second support rotator is rotatably fixed to the second housing bracket.

According to various embodiments, in the folded state, the folding area of the flexible display may be deformed into a waterdrop shape.

According to various embodiments, the hinge device (e.g., the hinge device 400 in FIG. 4A) for a foldable electronic device (e.g., the electronic device 200 in FIG. 1A) may include a hinge bracket (e.g., the hinge bracket 410 in FIG. 4A), a first slide rail (e.g., the first slide 421 in FIG. 4A) movably disposed at the hinge bracket and at one side of the folding axis, a second slide rail (e.g., the second slide rail 422 in FIG. 4A) movably disposed at the hinge bracket and at the other side of the folding axis, a first rotator (e.g., the first rotator 431 in FIG. 4A) disposed on the first slide rail to be rotatable around a first rotational axis (e.g., the first rotational axis (A1) in FIG. 4B), and a second rotator (e.g., the second rotator 432 in FIG. 4A) disposed on the second slide rail to be rotatable around a second rotational axis (e.g., the second rotational axis (A2) in FIG. 4B), wherein, when the electronic device transitions from a folded state to an unfolded state or from an unfolded state to a folded state, the first rotational axis is moved through movement of the first slide rail, and the second rotational axis is moved through movement of the second slide rail.

According to various embodiments, the first slide rail and the second slide rail may be linearly moved.

According to various embodiments, the first rotational axis may be located at the same point in the folded state and the unfolded state, and the second rotational axis may be located at the same point in the folded state and the unfolded state.

According to various embodiments, the first slide rail and the second slide rail may have a maximum linear movement distance at a designated intermediate folding angle.

According to various embodiments, the intermediate folding angle may be determined according to a deformed shape of the folding area in the folded state.

According to various embodiments, the first rotator and/or the second rotator may include a curved rotation part, the first slide rail and/or the second slide rail may include a curved guide rib disposed on an outer surface thereof, and the first rotator and/or the second rotator may be rotatably coupled to the guide rib by insertion of the guide rib into the guide rail thereof.

According to various embodiments, the electronic device may include a first support rotator having one end rotatably coupled to the hinge bracket and the other end rotatably coupled to the first rotator, and a second support rotator having one end rotatably coupled to the hinge bracket and the other end rotatably coupled to the second rotator.

The embodiments disclosed in the disclosure provided in the specification and drawings are merely presented as specific examples to easily explain the technical content according to the embodiments provided in the disclosure and help understanding of the embodiments provided in the disclosure, and are not intended to limit the scope of the embodiment of the disclosure. Therefore, the scope of the various embodiments in the disclosure should be interpreted that, in addition to the embodiments disclosed herein, all changes or modifications derived from the technical ideas of the various embodiments in the disclosure are included in the scope of the various embodiments in the disclosure.

What is claimed is:

1. An electronic device comprising:
a first housing;
a second housing;
a hinge device configured to connect the first housing and the second housing and to be foldable with respect to a folding axis; and
a flexible display supported by the first housing and the second housing,
wherein the hinge device comprises:
a hinge bracket;
a first slide rail movably disposed at the hinge bracket on a first side of the folding axis;
a second slide rail movably disposed at the hinge bracket on a second side of the folding axis;
a first rotator rotatably disposed on the first slide rail about a first rotational axis; and
a second rotator rotatably disposed on the second slide rail about a second rotational axis, and
wherein the first slide rail and the second slide rail are configured to move a designated linear distance relative to the hinge bracket during a folding operation or an unfolding operation of the electronic device, and wherein the first rotational axis is moved by movement of the first slide rail and the second rotational axis is moved by movement of the second slide rail during the folding operation or the unfolding opreation of the electronic device.

2. The electronic device of claim 1, wherein the first rotator is connected to the first housing, is rotatably coupled to the first slide rail, wherein the second rotator is connected to the second housing, is rotatably coupled to the second slide rail.

3. The electronic device of claim 1, wherein the first rotational axis is located at an identical position relative to the folding axis in a folded state of the electronic device and an unfolded state of the electronic device, and wherein the second rotational axis is located at an identical position relative to the folding axis in the folded state and the unfolded state.

4. The electronic device of claim 1, wherein the first slide rail and the second slide rail each have a maximum linear movement distance corresponding to a designated intermediate folding angle of the hinge device.

5. The electronic device of claim 4, wherein the designated intermediate folding angle comprises 45 degrees.

6. The electronic device of claim 4, wherein the flexible display comprises a folding area, and the designated intermediate folding angle is based on a deformed shape of the folding area in a folded state of the electronic device.

7. The electronic device of claim 1, wherein the hinge bracket comprises a first rail receiving part and a second rail receiving part, wherein the first slide rail comprise a guide groove comprising a designated length, wherein the guide groove of the first slide rail is coupled to the first rail receiving part such that the first slide rail is linearly movable, and wherein the second slide rail comprises a guide groove having a designated length, wherein the guide groove of the second slide rail is coupled to the second rail receiving part such that the second slide rail is linearly movable.

8. The electronic device of claim 1, wherein the first rotator comprises a curved rotation part comprising a first guide rail, and the second rotator comprises a curved rotation part comprising a second guide rail, wherein the first slide rail comprises a first curved guide rib disposed on an outer surface thereof, and the first rotator is rotatably coupled to the first slide rail via insertion of the first curved guide rib into the first guide rail, and wherein the second slide rail comprises a second curved guide rib disposed on an outer surface thereof, and the second rotator is rotatably coupled to the second slide rail via insertion of the second curved guide rib into the second guide rail.

9. The electronic device of claim 1, further comprising:

a first support rotator having one end rotatably coupled to the hinge bracket and the other end rotatably coupled to the first rotator; and a second support rotator having one end rotatably coupled to the hinge bracket and the other end rotatably coupled to the second rotator.

10. The electronic device of claim 9, further comprising:

a first hinge plate coupled to the first support rotator; and a second hinge plate coupled to the second support rotator, wherein in an unfolded state of the electronic device, the first housing, the first hinge plate, the second housing, and the second hinge plate form a plane.

11. The electronic device of claim 10, wherein, in a folded state of the electronic device, the first housing and the first hinge plate form a first plane, and the second housing and the second hinge plate form a second plane, wherein the first plane and the second plane are different.

12. The electronic device of claim 9, further comprising:

a first housing bracket configured to fix the first rotator to the first housing; and a second housing bracket configured to fix the second rotator to the second housing, wherein the first support rotator is rotatably fixed to the first housing bracket, and wherein the second support rotator is rotatably fixed to the second housing bracket.

13. The electronic device of claim 1, wherein in a folded state of the electronic device, a folding area of the flexible display is deformed into a waterdrop shape.

14. A hinge device for a foldable electronic device having a folding axis, the hinge device comprising:

a hinge bracket;

a first slide rail movably disposed at the hinge bracket on a first side of the folding axis;

a second slide rail movably disposed at the hinge bracket on a second side of the folding axis;

a first rotator disposed on the first slide rail to be rotatable around a first rotational axis; and a second rotator disposed on the second slide rail to be rotatable around a second rotational axis, wherein, the first rotational axis is moved through movement of the first slide rail, and the second rotational axis is moved through movement of the second slide rail during a folding operation or an unfolding operation of the foldable electronic device.

15. The hinge device of claim 14, wherein the first slide rail and the second slide rail are configured to be linearly movable.

16. The hinge device of claim 14, wherein the first rotational axis is located at an identical position relative to the folding axis in a folded state of the foldable electronic device and an unfolded state of the foldable electronic device, and wherein the second rotational axis is located at an identical position relative to the folding axis in the folded state and the unfolded state.

17. The hinge device of claim 16, wherein the first slide rail and the second slide rail each have a maximum linear movement distance corresponding to a designated intermediate folding angle of the hinge device.

18. The hinge device of claim 17, wherein the designated intermediate folding angle is determined according to a deformed shape of a display of the foldable electronic device in the folded state.

19. The hinge device of claim 14, wherein the first rotator comprises a curved rotation part comprising a first guide rail, and the second rotator comprises a curved rotation part comprising a second guide rail, wherein the first slide rail comprises a first curved guide rib disposed on an outer surface thereof, and the first rotator is rotatably coupled to the first slide rail via insertion of the first curved guide rib into the first guide rail, and wherein the second slide rail comprises a second curved guide rib disposed on an outer surface thereof, and the second rotator is rotatably coupled to the second slide rail via insertion of the second curved guide rib into the second guide rail.

20. The hinge device of claim 14, further comprising:

a first support rotator having one end rotatably coupled to the hinge bracket and the other end rotatably coupled to the first rotator; and a second support rotator having one end rotatably coupled to the hinge bracket and the other end rotatably coupled to the second rotator.

\* \* \* \* \*